United States Patent
Kojima et al.

[11] Patent Number: 5,930,411
[45] Date of Patent: Jul. 27, 1999

[54] IMAGE PROCESSING APPARATUS FOR ADJUSTING SCANNING POSITION

[75] Inventors: Akio Kojima, Neyagawa; Kazuyuki Murata, Kyoto; Naoki Takahashi, Moriguchi; Yasuhiro Kuwahara, Osaka, all of Japan

[73] Assignee: Matsushita Electric Industrial Co., Ltd., Osaka, Japan

[21] Appl. No.: 08/914,737

[22] Filed: Aug. 19, 1997

Related U.S. Application Data

[63] Continuation of application No. 08/419,409, Apr. 10, 1995, abandoned.

[30] Foreign Application Priority Data

Apr. 14, 1994 [JP] Japan .................................. 6-075858
Aug. 9, 1994 [JP] Japan .................................. 6-187482

[51] Int. Cl.$^6$ ......................................................... G06K 7/00
[52] U.S. Cl. ............................................ 382/312; 382/318
[58] Field of Search .................................... 382/254, 278, 382/294, 313, 318, 319, 312, 112, 284, 293, 295; 348/94–100, 106, 108; 358/474, 486, 487; 355/81

[56] References Cited

U.S. PATENT DOCUMENTS

| | | | |
|---|---|---|---|
| 4,262,280 | 4/1981 | Kochert | 382/254 |
| 4,860,377 | 8/1989 | Ishigaki | 382/282 |
| 4,901,163 | 2/1990 | Tsujioka et al. | 358/473 |
| 4,949,391 | 8/1990 | Faulkerson et al. | 382/313 |
| 5,187,753 | 2/1993 | Bloomberg et al. | 382/289 |
| 5,227,909 | 7/1993 | Watson | 359/196 |
| 5,257,325 | 10/1993 | Casparian et al. | 382/294 |
| 5,469,274 | 11/1995 | Iwasaki et al. | 382/294 |
| 5,515,181 | 5/1996 | Iyoda et al. | 358/474 |
| 5,517,588 | 5/1996 | Kondo | 382/300 |
| 5,525,788 | 6/1996 | Bridgelall et al. | 424/9.6 |
| 5,532,765 | 7/1996 | Inoue | 358/497 |
| 5,578,813 | 11/1996 | Allen et al. | 250/208.1 |
| 5,594,817 | 1/1997 | Fast et al. | 382/290 |
| 5,732,162 | 3/1998 | Curry | 382/294 |
| 5,787,195 | 7/1998 | Tsujimoto et al. | 382/292 |

FOREIGN PATENT DOCUMENTS

| | | |
|---|---|---|
| 56-27478 | 3/1981 | Japan . |
| 56-29775 | 3/1981 | Japan . |
| 61-105954 | 5/1986 | Japan . |
| 61-264484 | 11/1986 | Japan . |
| 62-61182 | 3/1987 | Japan . |
| 62-67687 | 3/1987 | Japan . |

OTHER PUBLICATIONS

Photogrammetric Engineering and Remote Sensing, vol. 42, No. 10, 1976, pp. 1285–1299.
English Language Foreign Search Report dated Jun. 20, 1995.

*Primary Examiner*—Jon Chang
*Assistant Examiner*—Jayanti K. Patel
*Attorney, Agent, or Firm*—Morrison & Foerster

[57] ABSTRACT

Picture images being joined without connection gaps can be produced with high quality by adjusting a position error, even if an error is included in a scanning position being detected, and by preventing a map missing area from arising which is caused by the adjustment of position error. A position error detection circuit detects a position error from picture information consisting of image data inside a scanning area being read overlapped by a line image sensor and storage data being stored in an image memory. Next, the position error detection circuit adjusts a scanning position coordinate for cancelling this position error, which is then output to a mapping circuit as an adjustment position coordinate. The mapping circuit stores the image data to the image memory according to the adjustment position coordinate.

22 Claims, 23 Drawing Sheets

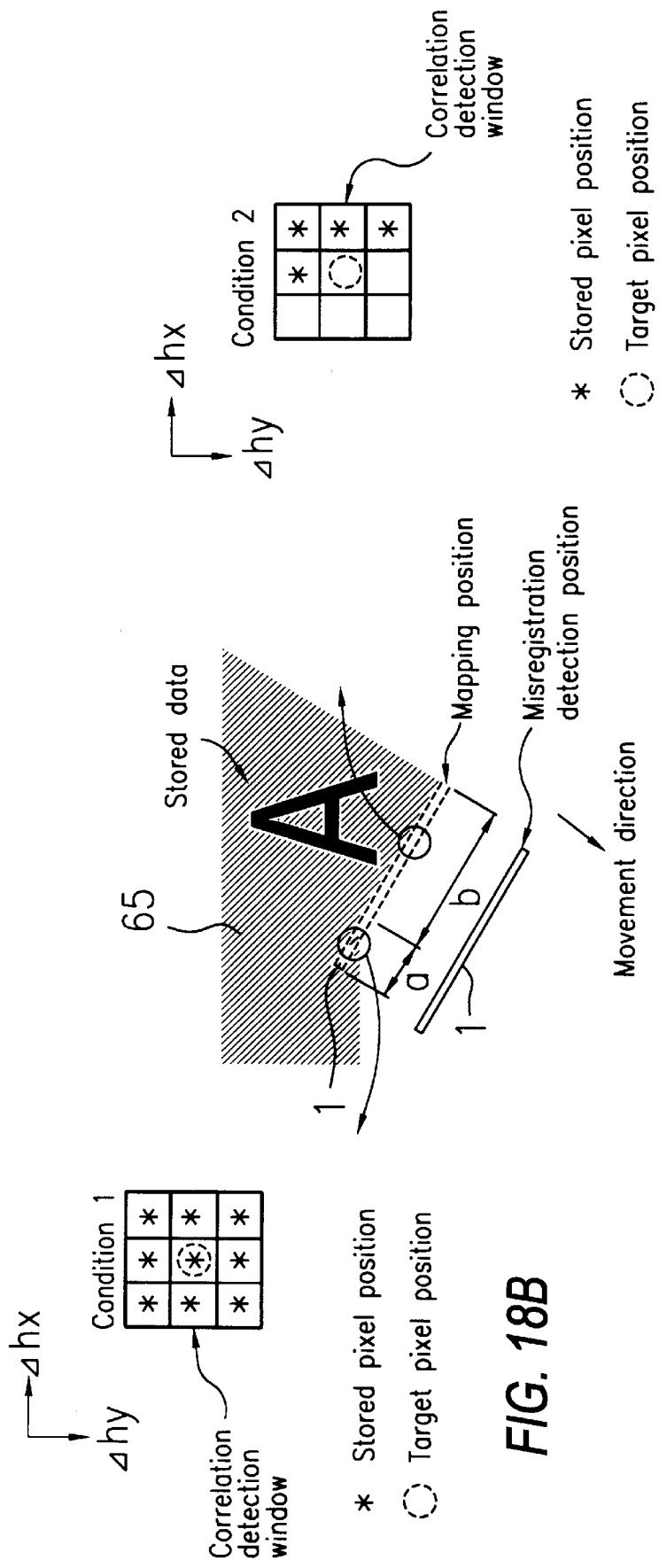

IMAGE PROCESSING APPARATUS FOR ADJUSTING SCANNING POSITION

This application is a continuation of application Ser. No. 08/419,409, filed Apr. 10, 1995, now abandoned.

FIELD OF THE INVENTION

This invention relates to an image processing apparatus which reads image data by scanning an original image and storing it into an image memory based on a scanning position corresponding to the image data.

BACKGROUND OF THE INVENTION

When a hand-held scanner is used, which reads an original image by being freely scanned by hands on the surface of an original, it usually functions such that scanning positions of an image sensor on the original are detected sequentially and image data is stored into an image memory on the basis of the scanning positions being detected.

An example of a method of detecting scanning positions of an image sensor on an original is disclosed in U. S. Pat. No. 4,260,979. This method uses a sheet with a reference grid printed on it as an auxiliary equipment. By scanning the surface of this sheet placed on top of an original with a photosensing element which is integrated with an image sensor for detecting the reference grid, a position of image data against the reference grid is calculated from an output of the photosensing element.

Another method is disclosed, for example, in U. S. Pat. No. 4,581,761, which uses a tablet as an auxiliary equipment. By scanning on the surface of an original placed on top of the tablet with a detection coil which is integrated with an image sensor, a coordinate position on the tablet is detected from an output of the detection coil, and a position of the image data is calculated based on the coordinate position being detected.

Yet another method is disclosed, for example, in Laid-open Japanese Patent Application No. (Tokkai Sho) 62-15964, in which an encoder is installed with a wheel which moves together with an image sensor generating a pulse in accordance with the wheel rotation. A position of the image sensor is detected from an output of the encoder, and a position of image data is calculated on the basis of the detected position.

When an image processing apparatus which applies one of these conventional detection method is used, a coordinate position of image data is calculated based on a scanning position being detected and stored into a predetermined address of an image memory. As a result, this apparatus can be prevented from being influenced by unintentional hand movement or meandering caused by a hand-held scanning, so that image data being stored as storage data in the image memory does not show any distortion.

However, the conventional system mentioned above has the following problems.

When auxiliary equipment, such as a sheet with a reference grid printed on it, or a tablet is used, it is necessary to process with accuracy and to install an expensive adjustment circuit for enhancing accuracy of a scanning position being detected and reducing an absolute position error, so that the cost usually becomes high. In addition, when auxiliary equipment with low accuracy is used, the scanning position being detected shows a large degree of absolute position error.

On the other hand, when an encoder installed with a wheel, which moves together with an image sensor generating pulses in accordance with a wheel rotation is used, a scanning position is calculated by counting pulses of the encoder which is detected sequentially with a starting position of scanning as a reference point. As a result, a large degree of cumulative position error occurs due to machine accuracy and slipping of the wheel etc.

When an absolute position error or a cumulative position error of a scanning position being detected reaches a large degree, a large position error arises with a normal scanning position on an original which is actually scanned by an image sensor (this position error is hereinafter referred to as a "position error").

When a coordinate position of image data is calculated based on this scanning position having a position error and is then stored into a predetermined address in an image memory, a problem arises that images which are reproduced on the image memory show great distortion. The distortion of reproduction images caused by this position error will be explained with reference to FIGS. 19 (*b*) to 19 (*d*).

FIG. 19 (*b*) shows a hand-held scanner 1004 which scans freely on the surface of an original 1000. As shown in FIG. 19 (*c*), a prior hand-held scanner which is capable of scanning only one direction can not read a large size area on the original 1000. However, since image data is stored on an image memory only with an area being read by a sensor for one direction, a connection gap does not occur. FIG. 19 (*d*) shows a case, in which a hand-held scanner which reads a large size area on the original 1000 by a free scanning. In this case, when image data is stored in an image memory based on a scanning position having a position error, connected parts of the image cause a position error, so that the image is distorted. In particular, when a scanner causing a cumulative position error is used, a position error becomes worse as a scanning area broadens. Thus, it is no longer possible to make out the image itself.

Next, problems related to storing image data into an image memory will be explained.

As shown in FIG. 22, when both a part 2002, where image data is stored (image data storage pixel), and a part 2003, where image data is not stored (hereinafter referred to as a "map missing area"), are present inside an image memory 2001, white lines stand out greatly in a solid black area, so that the image quality deteriorates considerably. Also, as shown in FIGS. 23 (*a*) and 23 (*b*), when this map missing area arises in a character area, white lines appear in a character, so the qualtiy of the character deteriorates considerably.

SUMMARY OF THE INVENTION

It is an object of this invention to solve the above-mentioned problems in the conventional system by providing an image processing apparatus which can produce high-quality images joined without a connection gap, which can be attained by adjusting a position error, even if an error is included in a scanning position being detected, and by preventing a map missing area caused by the adjustment of position error from arising.

In order to accomplish these and other objects and advantages, an image processing apparatus of this invention inputs image data being read by scanning an original image and a scanning position corresponding to the image data sequentially, and then stores the image data based on the scanning position into an image memory, wherein the image processing apparatus comprises at least a position error detection means which detects a position error of the scanning position from the image data and storage data being stored in the image memory for an overlapping scanning area being scanned redundantly and outputs a correction value for adjusting the position error; an adjustment means which adjusts the scanning position based on the correction value; and a mapping means which stores the image data into the image memory based on the adjusted scanning position.

It is preferable that the image processing apparatus further comprises an adjustment control means which varies a correction value at a predetermined rate, and the adjustment means adjusts a scanning position based on the correction value being varied at a predetermined rate.

Furthermore, it is preferable that the adjustment control means uses a value which is a correction value from a position error detection means being divided as a variable control amount, and varies the correction value stepwise at a predetermined rate for every differing scanning position.

In addition, it is preferable that the image processing apparatus further comprises a delay means which delays an adjusted scanning position and image data corresponding to the adjusted position error, and a mapping means differentiates a position for detecting a position error of the scanning position from a storage position for storing image data into the image memory by storing the corresponding image data into an image memory based on the delayed scanning position.

Also, it is preferable that the position error detection means comprises a scanning area retaining means which stores scanning confirmation information of image data being input into an image memory into a scanning confirmation information memory sequentially, and an overlapping area detection means which detects an overlapping scanning area being scanned redundantly by detecting scanning confirmation information in the scanning confirmation information memory.

It is preferable that an address of image data being stored in an image memory and an address of scanning confirmation information being stored in a scanning confirmation information memory are shared in the image processing apparatus.

Furthermore, it is preferable that the image processing apparatus further comprises a memory control means for controlling storage of image data into an image memory according to a judgement of a scanning area made by an overlapping area detection means, wherein the memory control means prohibits the image data from being stored into the image memory when it is judged as an overlapping scanning area being scanned redundantly.

In addition, it is preferable that the position error detection means uses a storage address in an image memory which corresponds to a coordinate value on an original of each pixel contained in image data being calculated based on a scanning position as a target pixel position, and comprises an image correlation means which detects a correlation value between the image data and storage data being stored in the image memory against a peripheral pixel position including the target pixel position respectively; and further comprises an adjustment amount calculation means which produces a correction value being determined in advance from a plurality of the correlation values.

Also, it is preferable that the position error detection means produces a plurality of correlation values only when all the peripheral pixel positions including the target pixel position are overlapping scanning areas where pixel positions are subject to correlation.

It is preferable that the adjustment means comprises a retaining means for producing a cumulative correction value obtained by accumulating correction values being output from a position error detection means, wherein a scanning position is adjusted by the cumulative correction value.

Furthermore, it is preferable that the mapping means comprises an address generation means for producing a storage address in an image memory which corresponds to a coordinate value on an original of each pixel contained in image data, and a data storage means for storing each pixel contained in the image data into the storage address in the image memory on the basis of a scanning position.

In addition, it is preferable that the image data and the scanning position are input from an input device comprising an image sensor for reading an image and a position detection means for detecting a reading position of the image sensor with two detection means.

Also, it is also preferable that the image sensor comprises a line sensor, and that the input device is a hand-held scanner.

Furthermore, it is preferable that the detection means comprises wheels which rotate in contact with an original face and encoders which output pulses corresponding to the rotation of the wheels.

In addition, it is preferable that the encoder outputs two signals of pulse having different phases.

Also, it is preferable that the input device is detachably installed to a main body of a portable information appliance.

It is preferable that the input device is installed to a main body of a portable information appliance by thrusting a lock-pin disposed in the input device into a pin insertion hole disposed in the main body of the portable information appliance.

Furthermore, it is preferable that the mapping means comprises a pixel density conversion means for densifying image data through an interpolation from adjacent pixels; a means of calculating a real number coordinate value on an original of each pixel contained in the densified image data based on a scanning position with the predetermined pixel density as a unit; an integral number means for converting the real number coordinate value on an original to an integral number coordinate value having the predetermined pixel density as a unit; a means for calculating a coordinate error value arising at the time of converting the coordinate value to an integral number; a means of converting the integral number coordinate value to an address in an image memory; and a means for comparing an amount of the coordinate error value with a predetermined value, wherein only pixels having the same or less amount of the coordinate error value with the predetermined value are stored in the address of the image memory.

In addition, it is preferable that the pixel density conversion means comprises a means for producing an interpolation pixel by using a processed pixel and adjacent pixels in the vicinity, wherein image data is converted into data having twice as much pixel density by means of the pixel density conversion means.

Also, it is preferable that interpolation pixels $Q_{i,j}$, $R_{i,j}$, and $S_{i,j}$ are calculated by Formula 3 mentioned below by using a processed pixel $P_{i,j}$ (which indicates the j pixel data in the i line of image data among the image data) and adjacent pixels in the vicinity $P_{i,j+1}$, $P_{i-1,j}$, and $P_{i-1,j+1}$.

$$Q_{i,j} = (P_{i,j} + P_{i,j+1})/2 \qquad \text{(Formula 3)}$$

$$R_{i,j} = (P_{i,j} + P_{i-1,j})/2$$

$$S_{i,j} = (P_{i,j} + P_{i,j+1} + P_{i-1,j} + P_{i-1,j+1})/4$$

It is preferable that the predetermined value ranges from about 0.3 to 0.35 with predetermined pixel density as a unit.

Furthermore, it is preferable that the image processing apparatus further comprises a coordinate rotation conversion means for rotating a scanning position at a plurality of predetermined angles with a predetermined coordinate in the center, and that the position error detection means further comprises an image correlation means which calculates a coordinate value on an original of each pixel contained in the image data respectively, based on the coordinate of the scanning position corresponding to the plurality of predetermined angles, and detects a correlation value between the image data and storage data being stored in the image memory respectively against a peripheral pixel position, including a target pixel position, by using a storage address in the image memory corresponding to the coordinate value as the target pixel position, and an adjustment amount calculation means, for producing an adjustment amount including a predetermined angle adjustment amount and a predetermined position adjustment amount, which are determined in advance from a plurality of correlation values obtained respectively against the predetermined angle.

In addition, it is preferable that the position error detection means produces a plurality of correlation values only when all the peripheral pixel positions, including the target pixel position, which are obtained against each rotation angle, are overlapping scanning areas where pixel positions are subject to correlation.

Also, it is preferable that the image correlation means produces a plurality of correlation values obtained respectively against each rotation angle.

It is preferable that the image data and the scanning position are input from an input device comprising a line image sensor for reading an image and a position detection means for detecting a reading position of the line image sensor with two detection means, and the coordinate rotation conversion means converts scanning position coordinates at both ends of the line image sensor rotationally into a plurality of directions on a coordinate with a scanning line as a unit.

Furthermore, it is preferable that the image data and the scanning position are input from an input device comprising a line image sensor for reading an image and a position detection means for detecting a reading position of the line image sensor with two detection means, and the image correlation means produces a plurality of correlation values which are obtained respectively according to the predetermined angles with a scanning line as a unit.

According to one configuration of the image processing apparatus of this invention, the image processing apparatus inputs image data being read by scanning an original image and a scanning position corresponding to the image data sequentially, and then stores the image data based on the scanning position into an image memory, wherein the image processing apparatus comprises at least a position error detection means which detects a position error of the scanning position from the image data and storage data being stored in the image memory for an overlapping scanning area being scanned redundantly and outputs a correction value for adjusting the position error; an adjustment means which adjusts the scanning position based on the correction value; and a mapping means which stores the image data into the image memory based on the adjusted scanning position. As a result, even if a position error is included in the scanning position being input, it is possible to detect a position error of the scanning position from image information of image data and storage data for an overlapping scanning area which scans redundantly and to adjust the position error. Then, by storing the image data into the image memory based on this adjusted scanning position, the image is prevented from being joined together with gap which is caused by the position error in the scanning position. In this way, distortion of images which are reproduced in the image memory can be reduced.

It is preferable that the image processing apparatus further comprises an adjustment control means which varies a correction value at a predetermined rate, and an adjustment means which adjusts a scanning position based on the correction value being varied at a predetermined rate. Accordingly, since it is possible to variably control the correction value for adjusting a position error at a predetermined rate and also to store image data into an image memory based on the adjusted scanning position, an area can be controlled from arising, in which image data is not stored inside the image memory which is caused by adjustment of the scanning position. Furthermore, the scanning position is not radically adjusted, so that a detection range of a correlation value can be reduced when a position error is detected from image information of image data and storage data. In this way, a small scale circuit can be used. In addition, since it is possible to prevent an area from arising, in which image data is not stored in the image memory (map missing), an error of a correlation value at the time of detecting a position error from image information of image data and storage data inside an overlapping scanning area can be decreased, so that the accuracy of position error detection can be improved.

According to the configuration of the apparatus of this invention, it is preferable that the image processing apparatus further comprises a delay means which delays an adjusted scanning position and corresponding image data, and a mapping means differentiates a position for detecting a position error of the scanning position from a storage position for storing image data into the image memory by storing the corresponding image data into an image memory based on the delayed scanning position. Accordingly, by determining the detection position of position error to be ahead of a movement direction of an image sensor, the accuracy in adjusting the position error can be improved in real-time. Incidentally, at the time of the real-time process, when storage of image data into an image memory (mapping process) and detection of position error are conducted in parallel, pixels being newly mapped and stored arise frequently in the vicinity of a target pixel, so that a correlation value is influenced by the newly mapped pixels. Also, if a detection position moves back and forth due to an unintentional movement of the hands when scanned manually, influence of newly mapped pixels becomes even stronger, which results in deteriorating accuracy of position error detection. However, as mentioned above, by differentiating a storage position for storing image data into an image memory (mapping position) from a detection position of position error and also by determining that the detection position of position error is ahead of a movement direction of an image sensor, the influence of the newly mapped pixels can be controlled, so that the accuracy of detecting the position error can be improved.

Also, it is preferable that the position error detection means comprises a scanning area retaining means which stores scanning confirmation information of image data being input to an image memory sequentially into a scanning confirmation information memory, and an overlapping area detection means which detects an overlapping scanning area being scanned redundantly by means of detecting scanning confirmation information in the scanning confirmation information memory. As a result, an overlapping scanning area being read redundantly can be specified, so that a position error can be detected only from the image data and the storage data inside an overlapping scanning area.

According to the configuration of the appratus of this invention, it is preferable that an address of image data being stored in an image memory and an address of scanning confirmation information being stored in a scanning confirmation information memory are shared in t he image processing apparatus. Accordingly, an address generation part and a memory control part can be simplified, and furthermore, a simultaneous access is enabled, so that an access speed can be improved to become faster. Also in this case, it is preferable that the image processing apparatus further comprises a memory control means for con trolling the storage of image data into an image memory according to a judgement of a scanning area made by an overlapping area detection means, wherein the memory control means prohibits the image data from being stored into the image memory when it is judged as an overlapping scanning area being scanned redundantly. As a result, by only storing image data of newly scanned areas into the image memory, the memory control means can store image data having a small scanning position error with priority into the image memory sequentially on top of the other, and distortion of combined image becomes smaller. Then, when a position error is detected based on the stored image information, accuracy of detection improves.

In addition, it is preferable that the position error detection means uses a storage address in an image memory which corresponds to a coordinate value on an original of each pixel contained in image data being calculated based on a scanning position as a target pixel position, and comprises an image correlation means which detects a correlation value between the image data and storage data being stored in the image memory against a peripheral pixel position including the target pixel position respectively; and further comprises an adjustment amount calculation means which produces a correction value being determined in advance from a plurality of the correlation values. In this way, by using a plurality of correlation values, the position error detection means can detect position errors against a plurality of direction. Also in this case, it is preferable that the position error detection means produces a plurality of correlation values only when all the peripheral pixel positions including the target pixel position are in overlapping scanning areas where pixel positions are subject to correlation. As a result, since all the correlation values can be detected under the same conditions, accuracy of detecting position errors with the use of a plurality of correlation values can be improved.

It is preferable that the adjustment means comprises a retaining means of producing a cumulative correction value obtained by accumulating correction values being output from a position error detection means, wherein a scanning position is adjusted by the cumulative correction value. Accordingly, by accumulating correction values for correction of position error, it is possible to attain a circuit which requires less adjustment processing of the scanning position including a cumulative error. This is because the position error is detected with the accumulated adjustment position in the center, so that a detection range of the position error can be reduced.

According to the configuration of the apparatus of this invention, it is preferable that the mapping means comprises an address generation means for producing a storage address in an image memory which corresponds to a coordinate value on an original of each pixel contained in image data, and a data storage means for storing each pixel contained in the image data into the storage address in the image memory on the basis of a scanning position. As a result, since the address generation means produces the storage address based on the coordinate of the scanning position on the original, the corresponding image data can be stored into a predetermined position of the image memory. Also in this case, it is preferable that the mapping means comprises a pixel density conversion means for densifying image data through an interpolation from adjacent pixels; a means of calculating a real number coordinate value on an original of each pixel contained in the densified image data based on a scanning position with the predetermined pixel density as a unit; an integral number means for converting the real number coordinate value on an original to an integral number coordinate value having the predetermined pixel density as a unit; a means of calculating a coordinate error value arising at the time of converting the coordinate value to an integral number; a means of converting the integral number coordinate value to an address in an image memory; and a means of comparing an amount of the coordinate error value with a predetermined value. Only pixels having the same or less amount of the coordinate error value with the predetermined value are stored in the address of the image memory. As a result, it is possible to select and store pixel data having a small error in a storage address into the image memory, so that the stored image has improved reproduction quality. When this storage data is used for detection of position error, it is possible to obtain a joined composite image with less distortion, so a image has improved quality. Also in this case, it is preferable that the pixel density conversion means comprises a means of producing an interpolation pixel by using a processed pixel and adjacent pixels in the vicinity, wherein image data is converted into that having twice as much pixel density by means of the pixel density conversion means. Thus, by increasing the pixel density, reproduction quality of the image can be improved. In addition, since the interpolation process can be attained as a power n, with 2 as a base ($2^n$), a circuit can be formed in bit shift, so the circuit can be simplified. Also in this case, it is preferable that interpolation pixels $Q_{i,j}$, $R_{i,j}$, and $S_{i,j}$ are calculated by Formula 3 mentioned above by using a processed pixel $P_{i,j}$ (which indicates the j pixel data in the i line of image data among the image data) and adjacent pixels in the vicinity $P_{i,j+1}$, $P_{i-1,j}$, and $P_{i-1,j+1}$. In this way, a predetermined interpolation pixel can be formed easily. When the predetermined value ranges from about 0.3 to 0.35 with predetermined pixel density as a unit, missing map pixels can be eliminated.

In addition, it is preferable that the image data and the scanning position are input from an input device comprising an image sensor for reading an image and a position detection means for detecting a reading position of the image sensor with two detection means. The scanning position of the image sensor can be specified with the two detection means so that a large original can be read by scanning reciprocately with one stroke. Also in this case, when the image sensor comprises a line sensor, an original can be scanned with one line as a unit. Thus, the image sensor can be miniaturized easily. Also, when the input device is a hand-held scanner, it is possible to input desired positions and areas on an original freely, which improves its operation.

Also in this case, it is preferable that the detection means comprises wheels which rotate in contact with an original face and encoders which output pulse in correspondence to the rotation of the wheels. Thus, when this detection means is compared with a hand-held scanner which uses a tablet or a sheet with a reference grid printed on it as auxiliary equipment, it does not require an expensive auxiliary equipment, so that an image processing apparatus which is small, portable, and excellent in its operation can be attained. Also, when the encoder outputs two systems of pulse having different phases, a rotation direction of the wheels and a movement distance can be detected by counting two systems of pulse having different phases. In this way, a position of the wheels after the movement can be detected with a predetermined position as a reference. In addition, it is preferable that the input device is detachably installed to a main body of a portable information appliance. As a result, the input device which is small and excellent in its operation can be attained.

According to the configuration of the apparatus of this invention, it is preferable that the image processing apparatus further comprises a coordinate rotation conversion means for rotating a scanning position at a plurality of predetermined angles with a predetermined coordinate in the center, and the position error detection means further comprises an image correlation means which calculates a coordinate value on an original of each pixel contained in image data respectively based on the coordinate of the scanning position corresponding to the plurality of predetermined angles and detects a correlation value between the image data and storage data being stored in the image memory respectively against a peripheral pixel position including a target pixel position by using a storage address in the image memory corresponding to the coordinate value as the target pixel position, and an adjustment amount calculation means for producing an adjustment amount including a predetermined angle adjustment amount and a predetermined position adjustment amount which are determined in advance from a plurality of correlation values obtained respectively against the predetermined angle. Thus, a position error can be detected based on a scanning position coordinate being converted rotationally by the coordinate rotation conversion means, so that a position error of an image sensor can be detected in the rotation direction.

As a result, images which are joined inside the image memory can have improved image quality. In addition, it is preferable that the position error detection means produces a plurality of correlation values only when all the peripheral pixel positions including the target pixel position which are obtained against each rotation angle are overlapping scanning areas where pixel positions are subject to correlation. In this way, all the correlation values can be detected under the same conditions, so that accuracy of detecting position errors with the use of a plurality of correlation values can be improved. Also, when the image correlation means produces a plurality of correlation values obtained respectively against each rotation angle, the correlation value is produced for every rotation angle, and the correlation value for detecting a gap in the rotation direction can be obtained. It is preferable that the image data and the scanning position are input from an input device comprising a line image sensor for reading an image and a position detection means for detecting a reading position of the line image sensor with two detection means, and the coordinate rotation conversion means converts scanning position coordinates at both ends of the line image sensor rotationally into a plurality of directions on a coordinate with a scanning line as a unit. As a result, by rotationally converting both ends of the line image sensor on the coordinate, a position error in the rotation direction can be detected with a scanning line as a unit. In this way, a position error in the rotation direction can be detected by means of a simple circuit. Furthermore, it is preferable that the image data and the scanning position are input from an input device comprising a line image sensor for reading an image and a position detection means for detecting a reading position of the line image sensor with two detection means, and the image correlation means produces a plurality of correlation values which are obtained respectively against a rotation angle with a scanning line as a unit. Accordingly, by detecting a position error in the rotational direction with a scanning line as a unit, both ends of the line image sensor on the coordinate can be adjusted with excellent accuracy by means of a simple circuit. As a result, a line image sensor which can be miniaturized and can attain higher resolution can be used as an input device.

BRIEF DESCRIPTION OF THE DRAWINGS

FIG. 18 is a schematic diagram showing an operation of a delay circuit in a third embodiment of this invention.

DETAILED DESCRIPTION OF THE INVENTION

This invention will be described more in detail by referring to the following illustrative examples and attached figures. The examples are not intended to limit the invention in any way.

EXAMPLE 1

Figure 1:
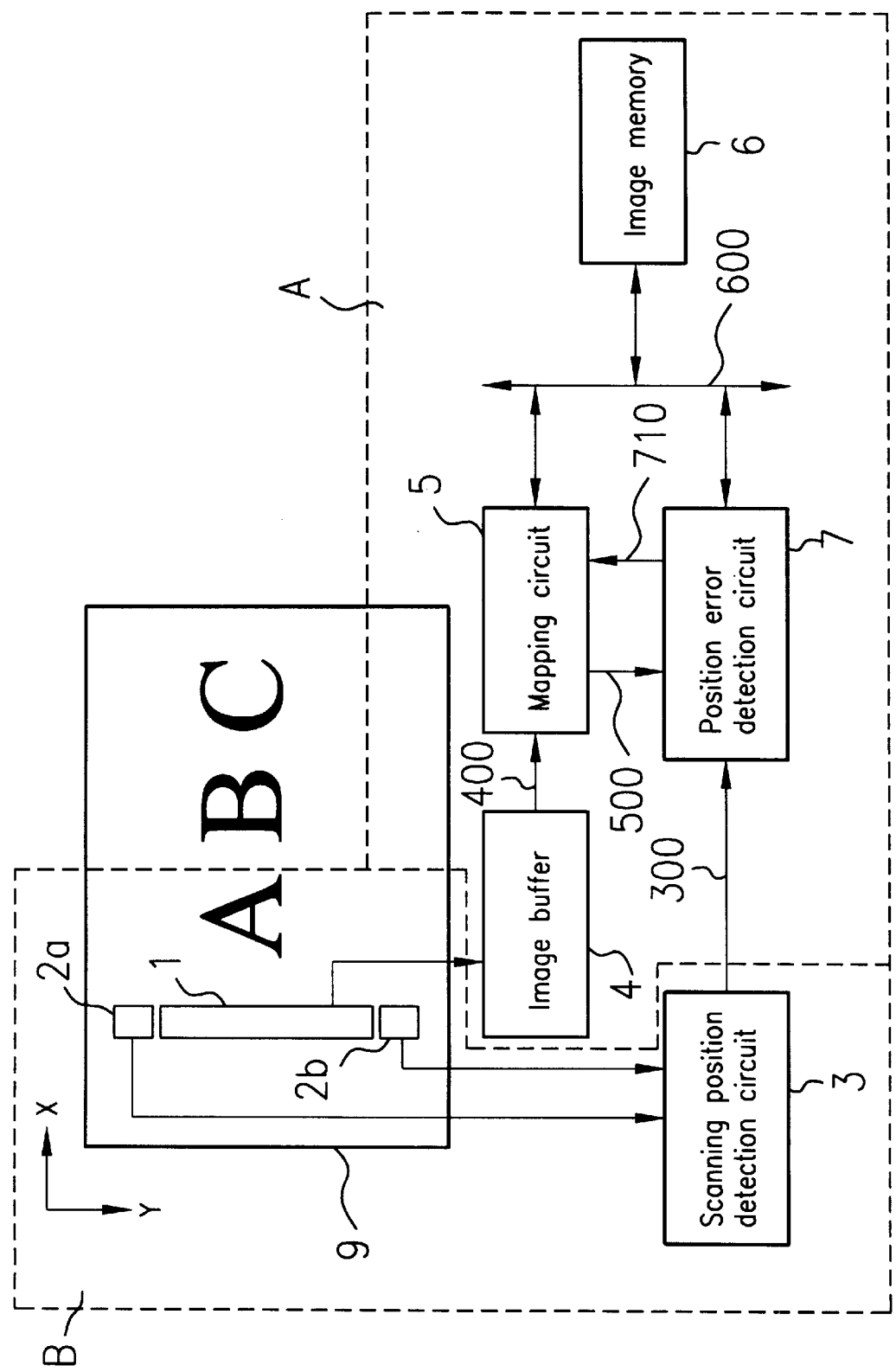
FIG. 1 is a block diagram showing an image processing apparatus and an image reading part which scans and reads an original image in a first embodiment of this invention.

A first embodiment of an image processing apparatus of this invention will now be explained with reference to FIG. 1, which is a block diagram showing an image processing apparatus and an image reading part which scans and reads an original image. In FIG. 1, A represents an image processing apparatus, and B represents an image reading part.

As shown in FIG. 1, a line image sensor 1 scans on the surface of an original 9 by being hand-operated and reads an original to produce image data. Then, the produced image data is output to an image buffer 4.

Figure 16:
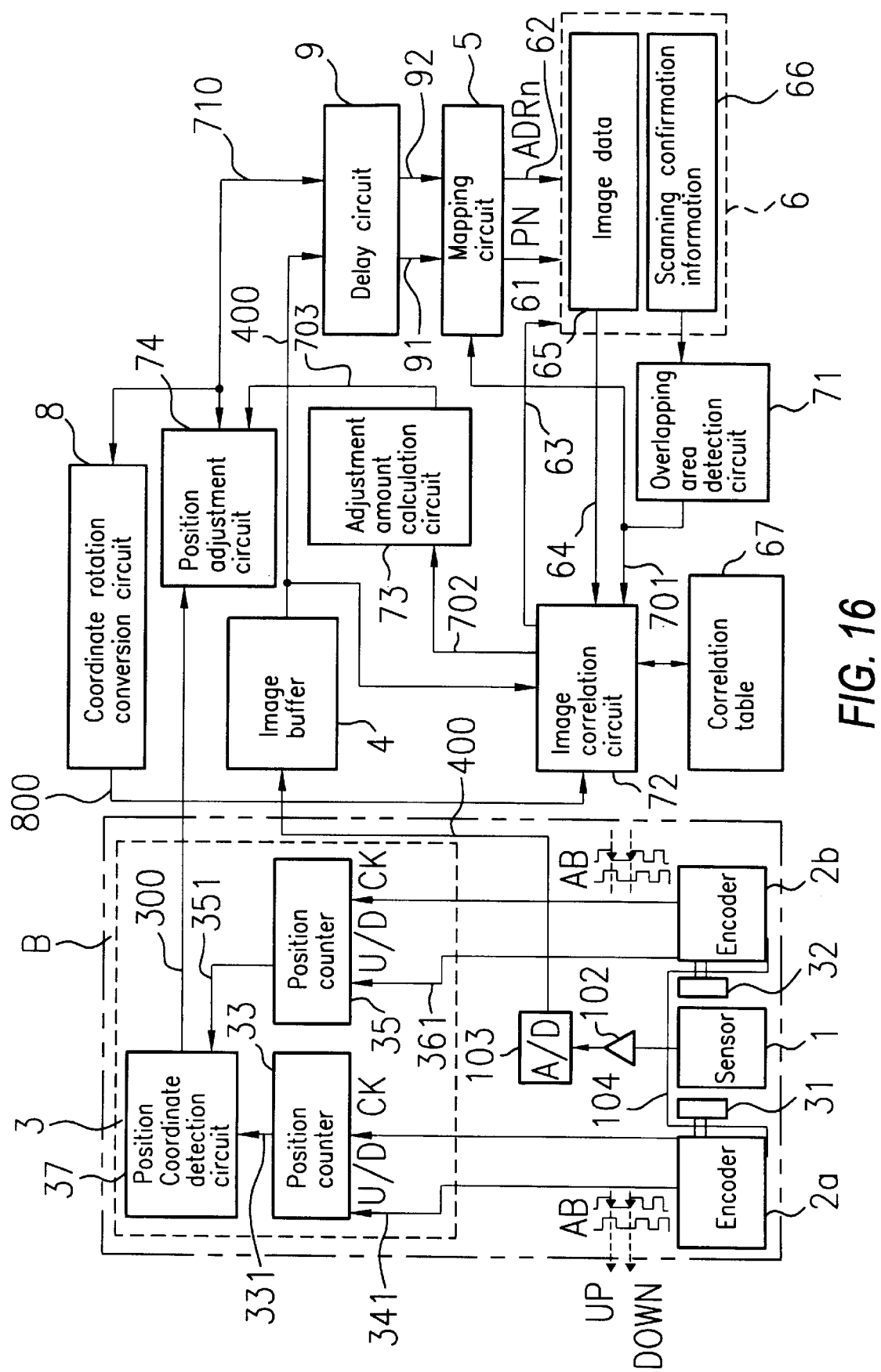
FIG. 16 is a block diagram showing an image processing apparatus and an image reading part which scans and reads an original image in a third embodiment of this invention.

As shown in FIG. 16, the image reading part B which scans and reads the original image is provided with a box 104 comprising a main body of a hand-held scanner disposed with the line image sensor 1; two wheels 31, 32 equiped at both ends of the line image sensor 1; and encoders 2a, 2b equiped at each wheel 31, 32 for detecting rotation of the wheels 31, 32. Encoders 2a, 2b respectively generate two-phase pulses consisting of an A-phase pulse and a B-phase pulse according to rotation angles of the wheels 31, 32 which differ from each other by only 90 degrees. Then, by means of the A-phase pulse and the B-phase pulse, rotation directions of the wheels 31, 32 are detected. Since the A-phase pulse and the B-phase pulse differ from each other in phase only by 90 degrees, a level of the A-phase pulse, which is detected by the rising of the B-phase pulse, is distinguished according to the rotation directions of the wheels 31, 32 into a "H" level and a "L" level. When the "L" level of distinguished signals 341, 361 is determined to be in the forward direction (upwards) of the wheels 31, 32, the "H" level becomes the backward direction (downwards) of the wheels 31, 32. When the signals 341, 361 are at the "L" level, position counters 33, 35 increase a count value in accordance to the number of the B-phase pulse, and when the signals 341, 361 are at the "H" level, they reduce a count value in accordance to the number of the B-phase pulse. A position coordinate detection circuit 37 inputs count values 331, 351 from the position counters 33, 35 and detects movement distances of both wheels 31, 32 respectively, wherein the rotation directions of the wheels 31, 32 are taken into consideration.

Next, as shown in FIG. 1, a scanning position detection circuit 3 calculates each coordinate of the wheels 31, 32 on the original 9 based on the movement distances of the wheels 31, 32. Furthermore, the scanning position detection circuit 3 converts the coordinates of the wheels 31, 32 into coordinates of reading pixels disposed respectively at both ends of the line image sensor 1, which are then output as a scanning position coordinate 300 to a position error detection circuit 7. As shown in FIG. 16, the scanning position detection circuit 3 comprises the position coordinate detection circuit 37 and position counters 33, 35. An operation of the scanning position detection circuit will be explained later in detail.

A mapping circuit 5 converts pixel density of image data 400 being output from the image buffer 4 and outputs densification image data 500. The position error detection circuit 7 calculates a correlation value between the densification image data 500 being output from the mapping circuit 5 and storage data being stored in an image memory 6. Furthermore, the position error detection circuit 7 uses a position adjustment amount which is calculated on the basis of this correlation value for adjusting the scanning position coordinate 300, which is then output to the mapping circuit 5 as an adjustment position coordinate 710. Moreover, the mapping circuit 5 uses the adjustment position coordinate 710, which is output from the position error detection circuit 7, to form an address in the image memory 6. Then, the mapping circuit 5 stores each pixel data of the densification image data 500 via a bus 600 into the image memory 6. An operation of the mapping circuit 5 and the position error detection circuit 7 will be explained later in detail.

Next, an operation of the scanning position detection circuit 3 will be explained more in detail.

Figure 2:
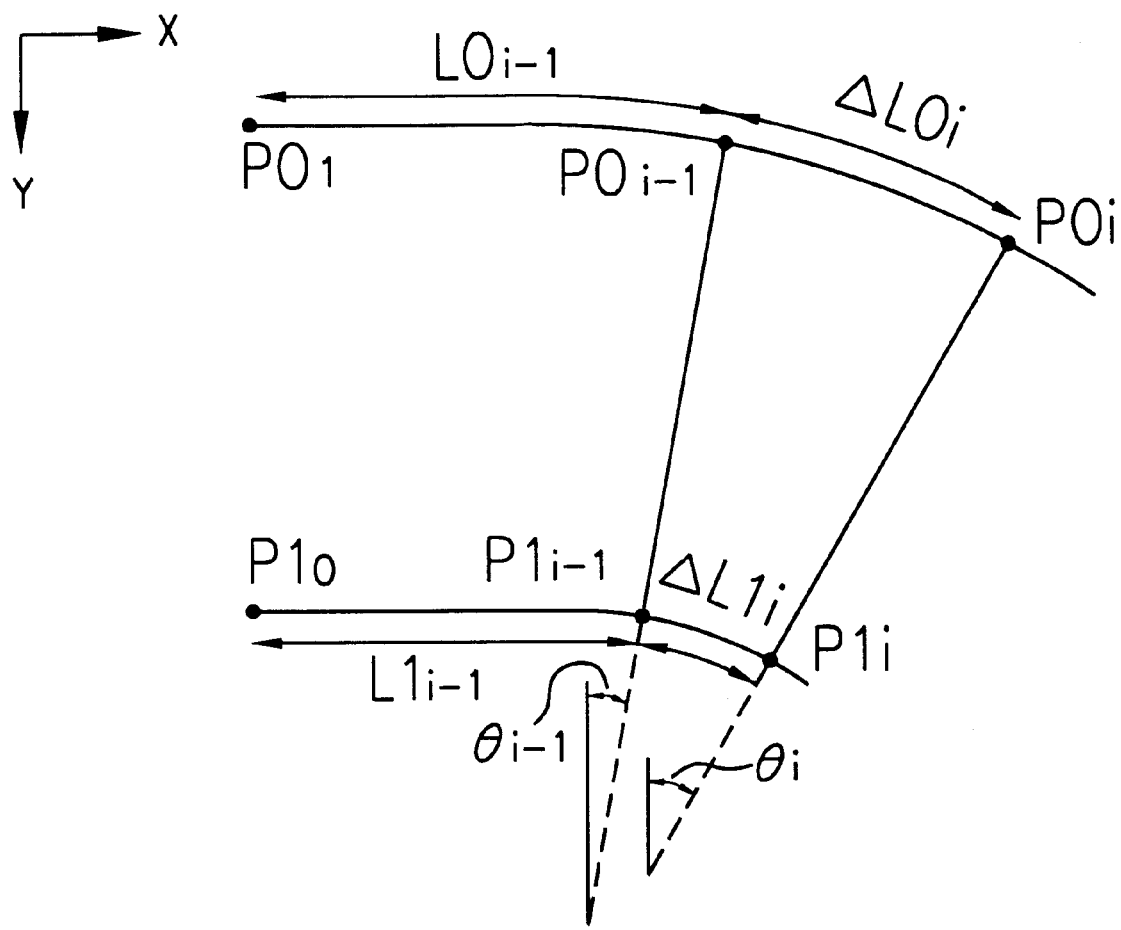
FIG. 2 is a schematic view showing an operation of a position detection circuit in a first embodiment of this invention.

FIG. 2 is a schematic view showing an operation of a scanning position detection circuit. In FIG. 2, thick lines show movement tracks of the two wheels 31, 32. Coordinates showing the positions of the two wheels 31, 32 at the time when the line image sensor 1 (FIG. 1) read pixel data in the i line are respectively described as $P0_i(X0_i, Y0_i)$, $P1_i(X1_i, Y1_i)$. Here, provided that coordinates of $P0_{i-1}$, $P1_{i-1}$ are already known, coordinates of $P0_i$, $P1_i$ are calculated approximately by using the following formula (Formula 1).

$$\theta_{i-1} = (L0_{i-1} - L1_{i-1})/D \qquad \text{(Formula 1)}$$

$$X0_i = X0_{i-1} + \Delta L0_i \cdot \cos\theta_{i-1}$$

$$Y0_i = Y0_{i-1} + \Delta L0_i \cdot \sin\theta_{i-1}$$

$$X1_i = X0_i - D \cdot \sin\theta_{i-1}$$

$$Y1_i = Y0_i - D \cdot \cos\theta_{i-1}$$

In this formula and elsewhere throughout this description, · represents an operation of multiplication, and / represents an operation of division. $L0_{i-1}$ shows a movement distance of the wheels 31, 32 moved while reading from the start to the (i−1) line. $\Delta L0_i$ shows a movement distance of the wheels 31, 32 moved while reading from the (i−1) line to the i line. Since the movement distances take rotation directions of the wheels 31, 32 into consideration, the values can be negative. Furthermore, the movement distances of the wheels 31, 32 on the original 9 can be obtained by using a number of pulse N of the encoders 2a, 2b as well as a resolution P per one pulse (inch/1 pulse), and by calculating P×N. The position coordinate detection circuit 37 reads the count values 331, 351 of the position counters 33, 35 in synchronization with the reading period of the line image sensor 1 and detects the movement distance $\Delta L0_i$ on the original 9 including the rotation directions of the wheels 31, 32 from a difference between the count values detected at the i line and the (i−1) line. D represents a distance between the wheel 31 and the wheel 32. Formula 1 mentioned above is an approximate calculation, assuming that $\Delta\theta=|\theta_i-\theta_{i-1}|=|\Delta L0_i-\Delta L1_i|/D$ is 0. A 0 shows an angle change of the line image sensor 1 while the line image sensor 1 scans one line. By using Formula 1 mentioned above, if coordinates of the two wheels 31, 32 at the start of reading are once determined, it is possible to calculate coordinates from the movement distances of the two wheels 31, 32.

Figure 3:
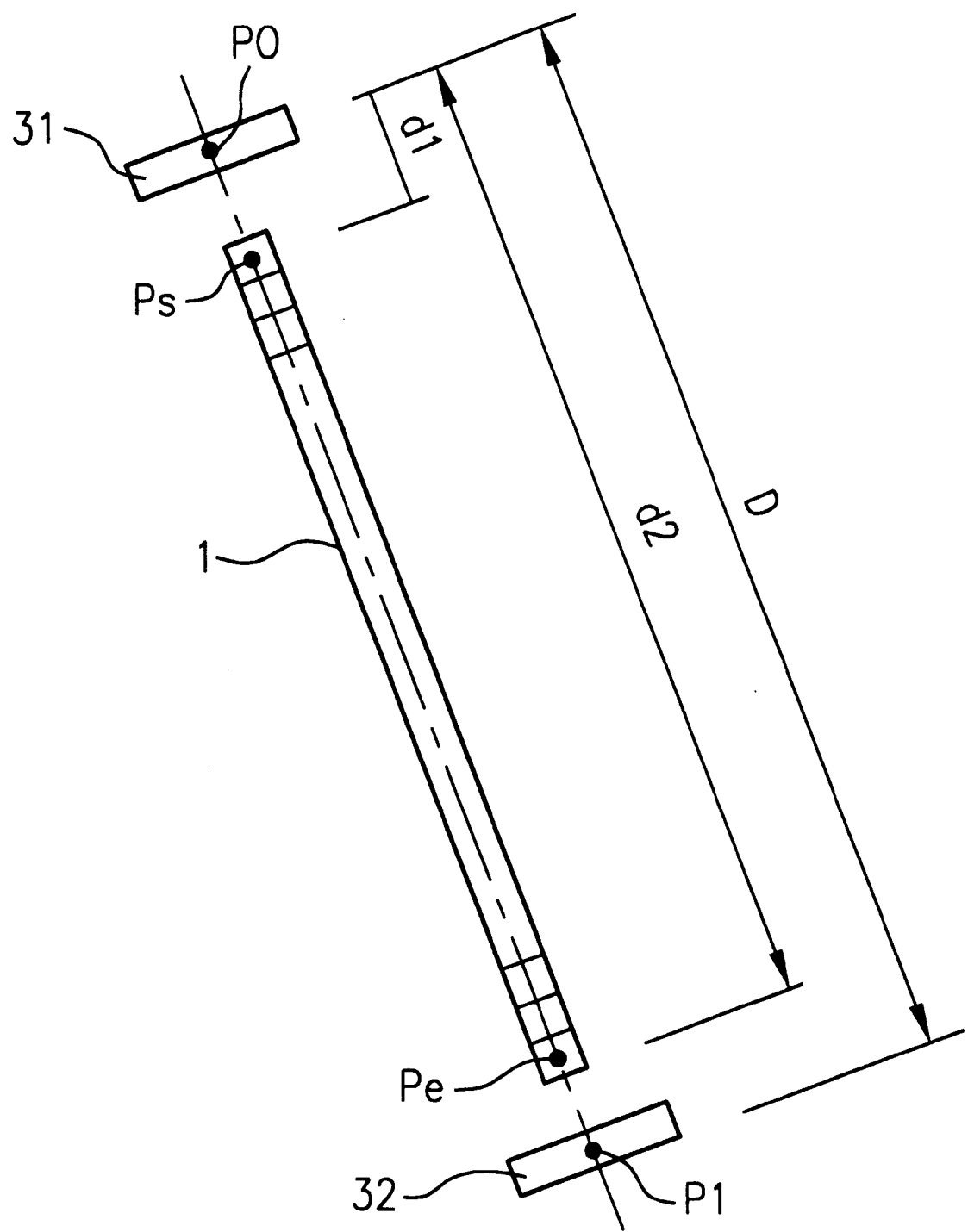
FIG. 3 is a schematic view showing a coordinate calculation of reading pixels provided at both ends of a line image sensor in a first embodiment of this invention.

FIG. 3 is a schematic view showing a coordinate calculation of reading pixels provided at both ends of a line image sensor. A coordinate of the wheel 31 is determined to be P0(X0, Y0), and a coordinate of the wheel 32 is determined to be P1(X1, Y1). Coordinates Ps(Xs, Ys) and Pe(Xe, Ye) of pixels disposed at both ends of the line image sensor 1 are calculated by solving the following formula (Formula 2).

$$Xs = X0 + (X1 - X0) \cdot d1 / D \quad \text{(Formula 2)}$$
$$Ys = Y0 + (Y1 - Y0) \cdot d1 / D$$
$$Xe = X0 + (X1 - X0) \cdot d2 / D$$
$$Ye = Y0 + (Y1 - Y0) \cdot d2 / D$$

In this formula, D represents a distance between the wheel 31 and the wheel 32; d1 represents a distance from the wheel 31 to the reading pixel Ps; and d2 represents a distance from the wheel 31 to the reading pixel Pe.

The scanning position detection circuit 3 makes use of the movement distances of the wheels 31, 32 obtained from the two-phase pulses generated by the encoders 2a, 2b, and performs the above-mentioned operations of Formula 1 and Formula 2. Then, the coordinates Ps(Xs, Ys) and Pe(Xe, Ye) of the reading pixels disposed at both ends of the line image sensor 1 are output to the position error detection circuit 7 as the scanning position coordinate 300.

Figure 4:
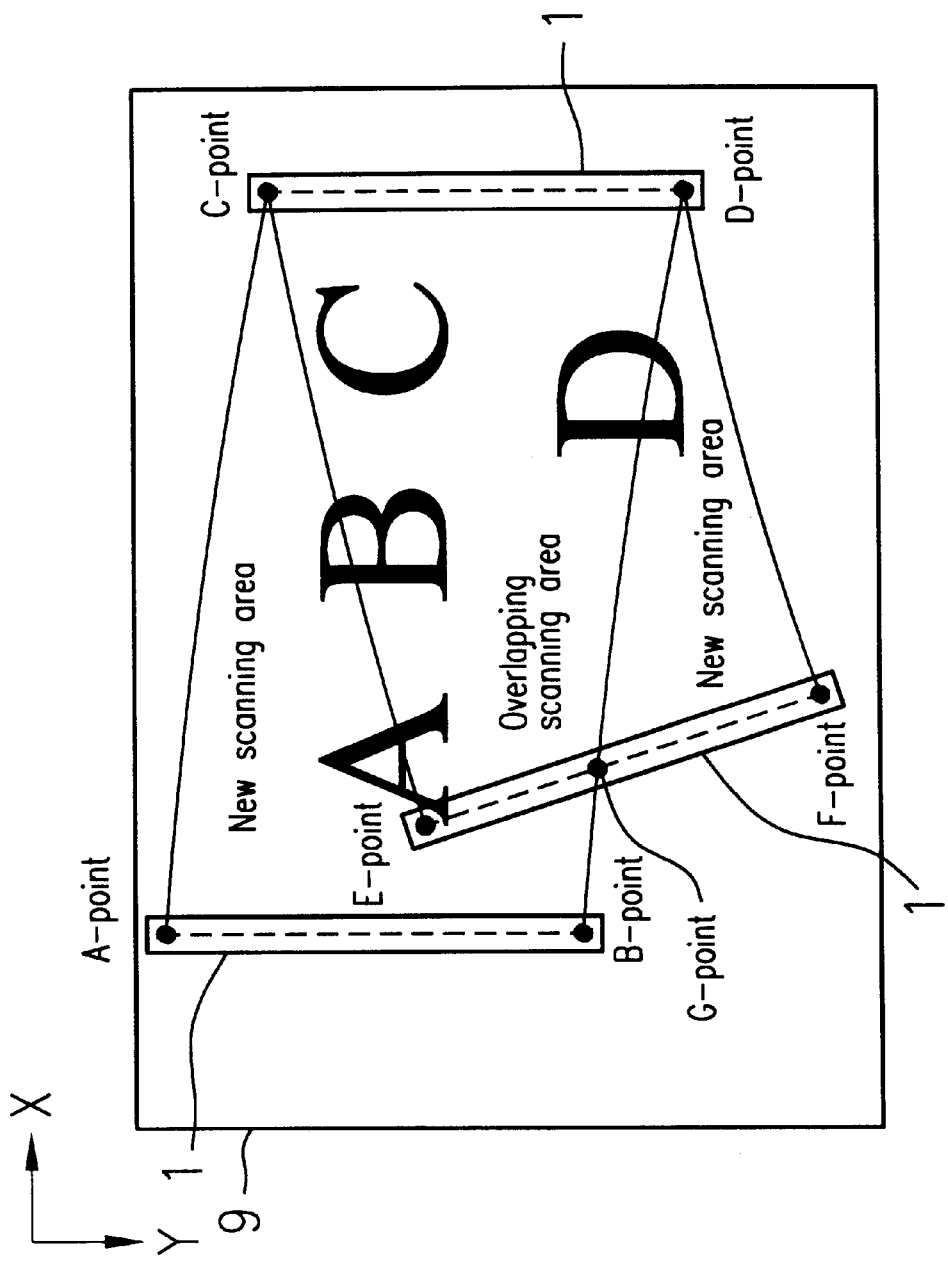
FIG. 4 is a schematic view showing scanning areas of a line image sensor in a first embodiment of this invention.

FIG. 4 is a schematic view showing scanning areas of a line image sensor. By referring to FIG. 4, a movement of a line image sensor 1 scanning by an hand-operation will be explained, provided that a reading area of an original 9 is wider than a length of the line image sensor 1. For reading the original 9, an operator puts a main body of a hand-held scanner in contact with the original 9 and moves it reciprocatively on the surface of the original 9 by hand for scanning. At this time, two wheels 31, 32 disposed at the main body of the hand-held scanner rotate, and two-phase pulses are output from the encoders 2a, 2b. FIG. 4 shows areas on the original 9 being read by the line image sensor 1.

Since the line image sensor 1 cannot scan the breadth extreme of the original 9, an image reading part B (FIG. 1) reads the entire original 9 by the reciprocating motion of the line image sensor 1. Although only positions of both pixels of the line image sensor 1 are indicated in FIG. 4, the line image sensor 1 reads an image present on a line formed by binding both end pixels in the line image sensor 1. For example, when both end pixels of the line image sensor 1 are indicated as an A-point and a B-point, the line image sensor 1 reads on the line formed by binding the A point with the B point (hereinafter, this is referred to as a "reading position A-B").

In FIG. 4, the line image sensor 1 starts scanning from the reading position A-B and scans to a reading postion C-D. Picture image data inside an area ABCD formed by connecting A-point, B-point, C-point, and D-point is read, and each pixel contained in this image data is stored newly into the image memory 6 by a mapping circuit 5 (FIG. 1) based on the scanning position coordinate 300 being output from a scanning position detection circuit of 3 (FIG. 1). Hereinafter, this area is referred to as a "new scanning area".

Next, the line image sensor 1 moves in the backward direction and scans from the reading position C-D to a reading position E-F. An area CDGE formed by connecting C-point, D-point, G-point, and E-point is an area in which the images overlap. Hereinafter, this area which is read redundantly is referred to as an "overlapping scanning area". An area DGF formed by connecting D-point, G-point, and F-point is a new scanning area. In this way, the overlapping scanning area CDGE, a new scanning area ABGEC, and the new scanning area DFG are present.

If the scanning position coordinate 300 does not have a position error, each pixel inside the reading image data can be mapped and stored in the image memory 6. In other words, even if the image data being read in the overlapping scanning area CDGE is overwritten in the image memory 6, an image being read inside the image memory 6 shows no discrepancy at a part where the new scanning area ABGEC and the overlapping scanning area CDGE are joined together. However, being influenced by accuracy of structure design of a hand-held scanner, slipping between the wheels 31, 32 and the original 9, sinking of the wheels 31, 32 into the original 9, and a width between the wheel 31 and the wheel 32 at the time when scanned in curves by the hands, a position error is included in the scanning position coordinate 300. Furthermore, since the scanning position detection circuit 3 obtains movement distances of the encoders 2a, 2b by counting the two-phase pulses being output from the encoders 2a, 2b, the above-mentioned position error is accumulated. Therefore, when the image data 400 is mapped to the image memory 6 by using the scanning position coordinate 300, a discrepancy or a gap of an image arises at the above-mentioned joint part. Here, the term "map" indicates a movement of storing the image data being read into a predetermined address in the image memory 6.

In order to prevent this discrepancy of image from occurring, the position error detection circuit 7 uses the image data of the overlapping scanning area CDGE being stored in the image memory 6 and the densification image data 500 to calculate a correlation value which shows a degree of correlation between these data. Furthermore, based on this correlation value, the position error detection circuit 7 calculates a position adjustment amount for adjusting the scanning position coordinate 300. The position error detection circuit 7 adjusts the scanning position coordinate 300 according to this position adjustment amount, which is then output to the mapping circuit 5 as the adjustment position coordinate 710. According to the adjustment position coordinate 710, the mapping circuit 5 forms an address so that each pixel inside the densification image data 500 is mapped to the image memory 6, and then, pixels are stored in the image memory 6. As for an extraction of the overlapping area CDGE, the explanation follows later.

Figures 7A, 7B:
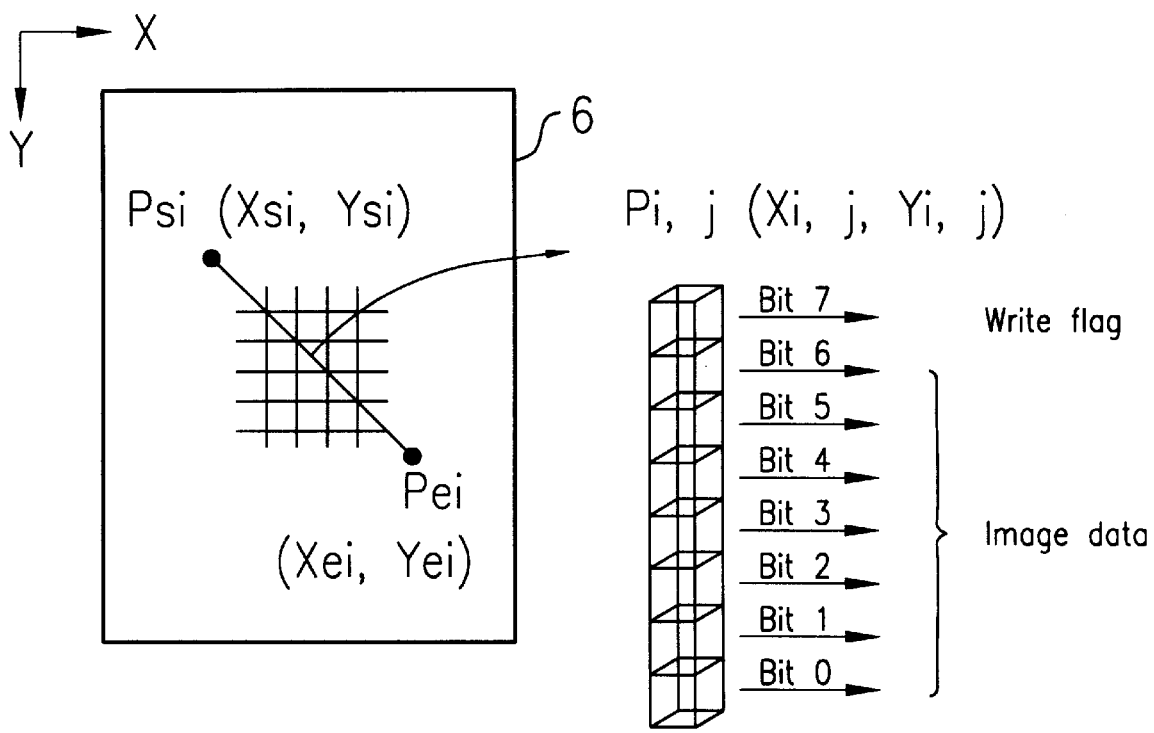
FIG. 7 is a schematic view showing an image memory in a first embodiment of this invention.

FIG. 7 is a schematic view showing an image memory. A bit of each pixel in the image memory 6 is comprised of a write flag storage bit (bit 7) for holding scanning confirmation information and image data storage bits (bits 0~6). Here, a number of image data storage bit is not specified, and this number can be designed according to a necessary gradation number. This embodiment deals with an image of 128 gradations, and in order to store variable-density data having 0 to 127 values, 7 bits are secured per one pixel in the image memory 6. Bit 7 of the write flag results in "0" when image data is not written in the image memory 6 (namely, in an unstored condition), and the write flag results in "1" when the image data is already written (namely, in a stored condition). In this way, by sharing the memory for storing image data and the memory for storing scanning confimation information, addresses can be formed easily and a memory control part can be simplified. Furthermore, since it is possible to have access simultaneously, the speed of access can be improved to become higher. In addition, the memory for storing the image data and the memory for storing scanning confimation information can be configured separately, and the scanning confirmation information may be stored in block unit instead of in pixel unit. It is sufficient to store scanning confimation information which can specify a storage position of the image data.

Next, an operation of the position error detection circuit 7 will be explained.

Figure 5:
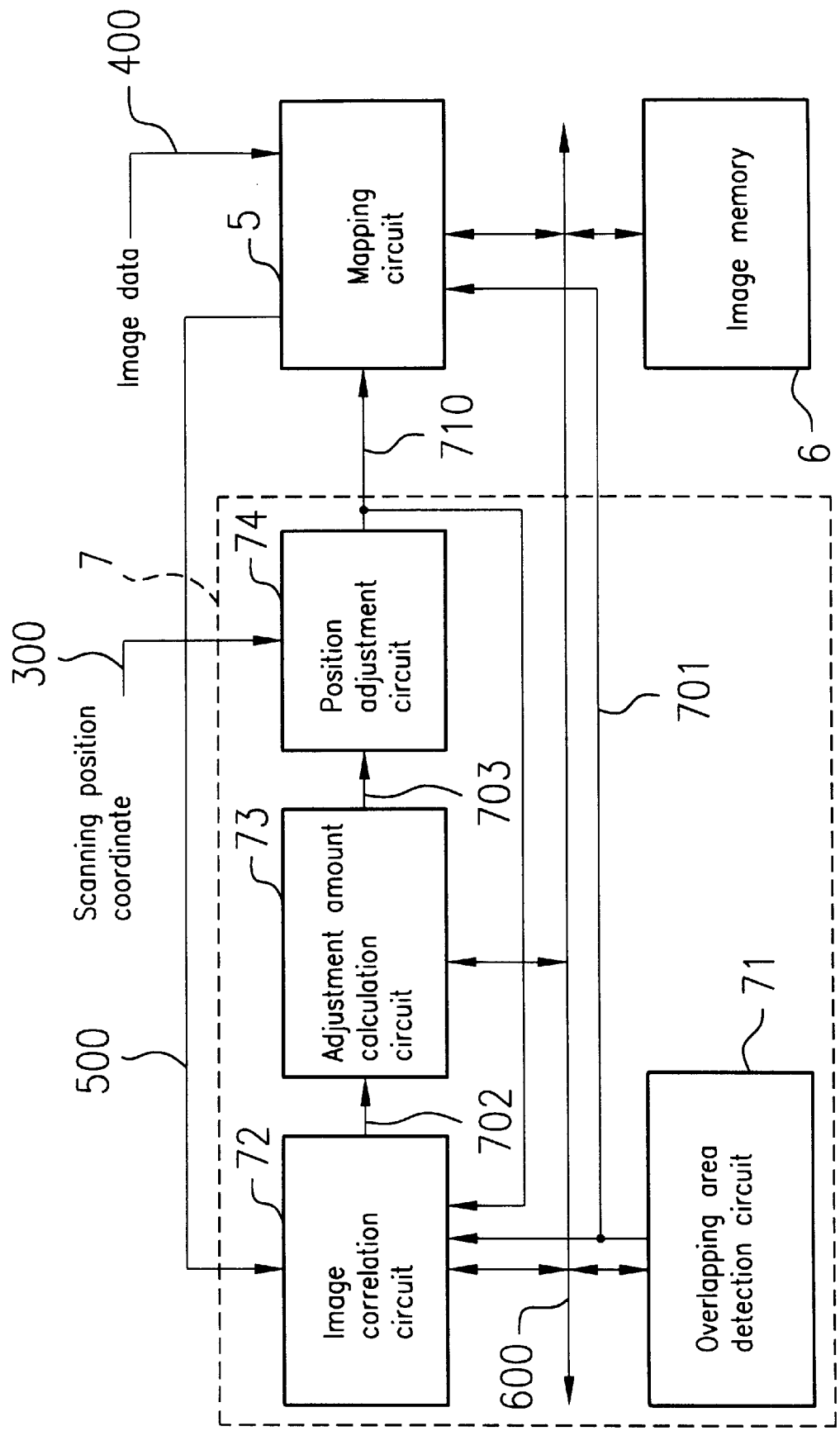
FIG. 5 is a block diagram showing a position error detection circuit in a first embodiment of this invention.

FIG. 5 is a block diagram showing a position error detection circuit. Before a line image sensor 1 starts scanning by reading, all the data in the image memory 6, a position adjustment amount 703 in an adjustment amount calculation circuit 73, and a correlation table inside an image correlation circuit 72 are initialized to "0". After the initialization, every time when the line image sensor 1 reads and scans a line, the scanning position coordinate 300 is adjusted by the position adjustment circuit 74, which is then output to the mapping circuit 5 as the adjustment position coordinate 710. At the time when the ine image sensor 1 starts scanning by reading, the position adjustment amount 703 is "0", so that the scanning position coordinate 300 and the adjustment position coordinate 710 have the same coordinate value.

The mapping circuit 5 densifies the image data 400 by a conversion process of pixel density and produces the densification image data 500. Furthermore, the mapping circuit 5 uses the adjustment position coordinate 710 being input for calculating a storage address ADRn towards the image memory 6 of each pixel data Pn inside the densification image data 500. According to the address ADRn, the mapping circuit 5 reads the pixel data Pn which is stored in the address ADRn of the image memory 6 by way of the bus 600, and this pixel data Pn is output to an overlapping area detection circuit 71 via the bus 600. An operation of the mapping circuit 5 will be explained later more in detail.

The overlapping area detection circuit 71 checks the write flag (bit 7) of the pixel data Pn, and judges whether the image data is already stored in the address ADRn of this pixel data Pn. When the write f lag (bit 7) of the pixel data Pn indicates 1, it shows that the image data is already stored in the address ADRn through the scanning of reading by means of the line image sensor 1, so that the pixel data Pn is judged as being included in an overlapping scanning area. Furthermore, when the write flag (bit 7) of the pixel data indicates 0, the pixel data Pn is judged as being included in a new scanning area. The overlapping area detection circuit 71 outputs a judgement signal 701 to the image correlation circuit 72 and to the mapping circuit 5. In this case, the judgement signal 701 is a signal which indicates "0" when the pixel data Pn is included in a new scanning area, and when the pixel data Pn is included in an overlapping scanning area, the signal indicates "1".

The image correlation circuit 72 performs a correlation value calculation process of the pixel data Pn when the judgement signal 701 indicates "1", and when the judgment signal 701 indicates "0", a correlation value calculation process of the pixel data Pn is not performed. The mapping circuit 5 stores the densification pixel data Pn into the image memory 6 when the judgement signal 701 is "0", and when the judgment signal 701 is "1", the densification pixel data Pn is not stored into the image memory 6. A series of this processing operation which is conducted for one pixel unit is performed for all the pixel data included in one line of the densification image data 500.

At the time when the above-mentioned process of the densification image data 500 for one line is over, the image correlation circuit 72 uses a correlation table which was formed by conducting a correlation value calculation process only for pixels included in the overlapping scanning area in order to detect a position error direction of the scanning position coordinate 300. Furthermore, the image correlation circuit 72 outputs an offset value 702 to the adjustment amount calculation circuit 73 for cancelling the position error. When all the densification pixels in one line are included in the new scanning area, the correlation table of the image correlation circuit 72 still remains as the initial value of "0". In this instance, the offset value 702 results in "0" (no position error).

The adjustment amount calculation circuit 73 adds the offset value 702 to an accumulated value of adjustment amounts being held inside, which is then output to a position adjustment circuit 74 as the position adjustment amount 703. The position adjustment circuit 74 adds the scanning position coordinate 300 of image data for the next one line to be processed and the position adjustment amount 703, which is then output to the mapping circuit 5 as the adjustment position coordinate 710. Hereinafter, a series of the above-mentioned process is repeated sequentially for every line.

Figure 6:
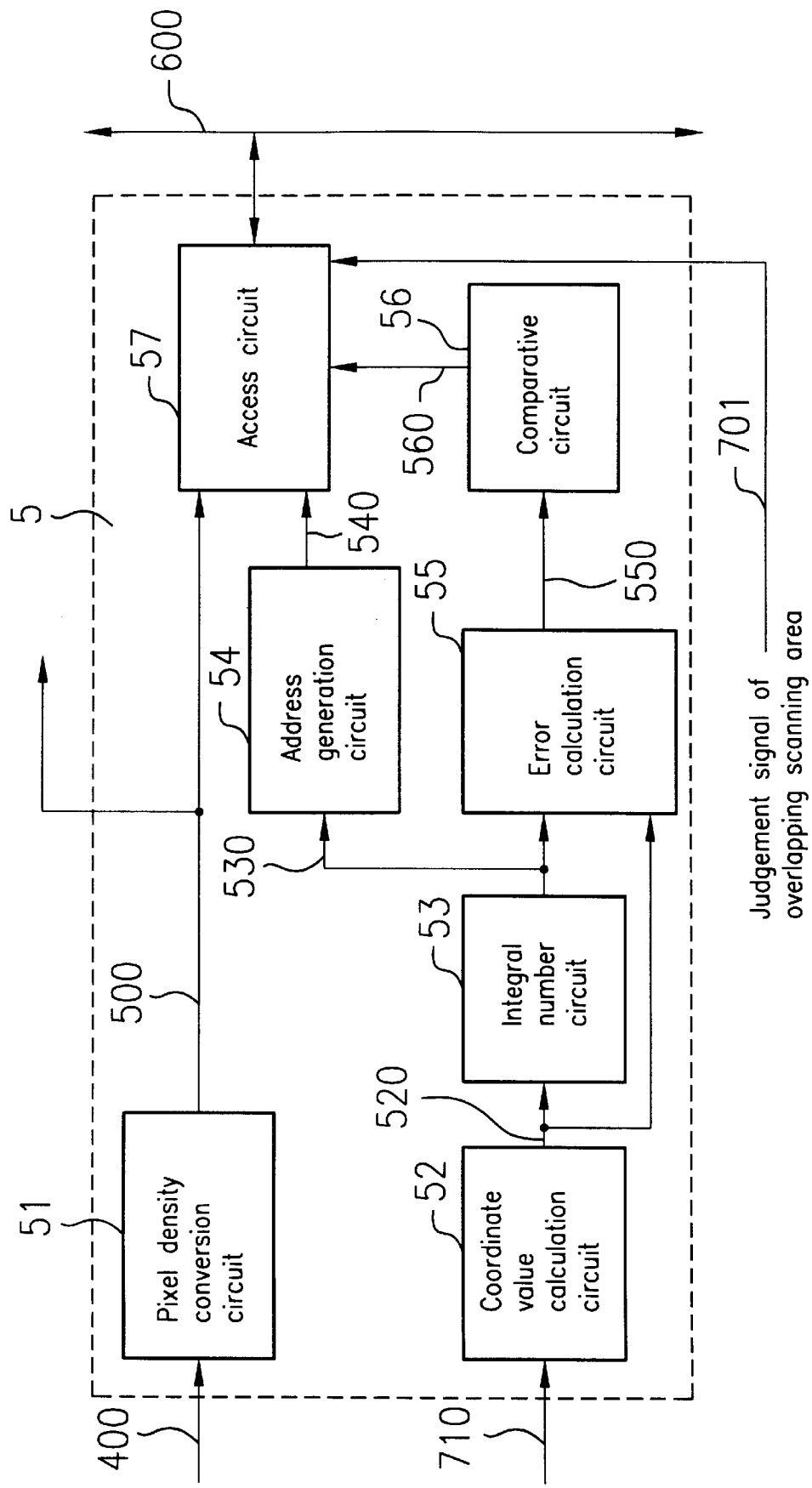
FIG. 6 is a block diagram showing a mapping circuit in a first embodiment of this invention.
Figure 9B:
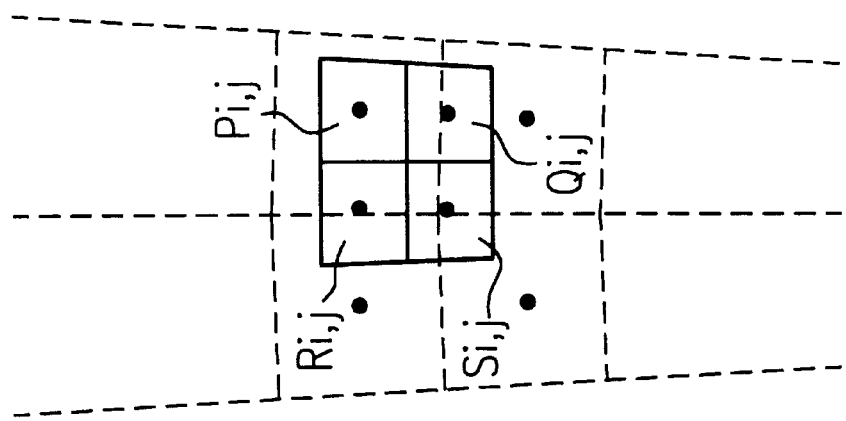
FIGS. 9 (*a*) and 9 (*b*) are schematic views showing a pixel density conversion in a first embodiment of this invention.
Figure 9A:
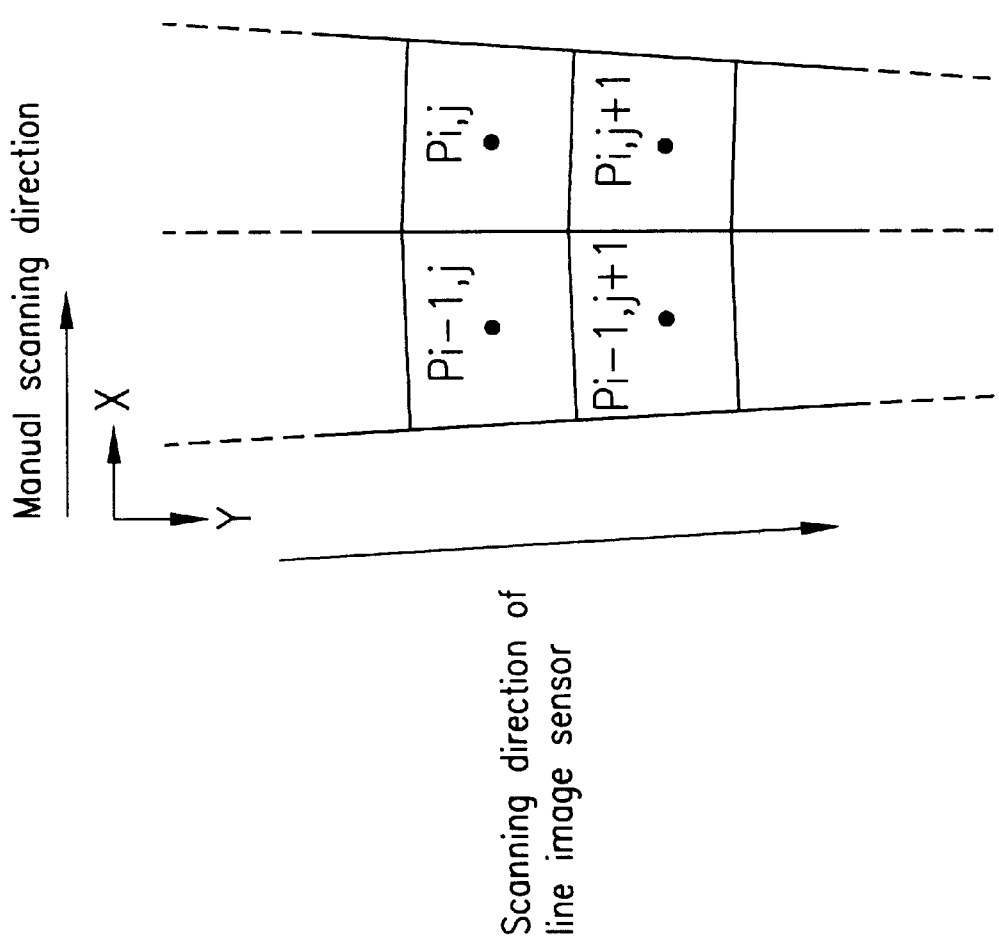

Next, an operation of the mapping circuit 5 will be explained by referring to FIGS. 6, 7, and 9. FIG. 6 is a block diagram showing a mapping circuit; FIG. 7 is a schematic view showing an image memory; and FIGS. 9 (a) and 9 (b) are schematic view showing a pixel density conversion.

As shown in FIG. 6, a pixel density conversion circuit 51 produces three interpolation pixels against one pixel data contained in the image data 400, and outputs the densification image data 500 which is densified twice as much.

First, a method of producing an interpolation pixel will be explained by using the FIGS. 9 (a) and 9 (b). In FIGS. 9 (a) and 9 (b), $P_{i,j}$ indicates the j pixel data in the i line of image data in the image data 400. A black dot shows a coordinate point in each pixel data. FIG. 9 (a) shows four adjacent pixels in the image data 400. In FIG. 9 (b), $Q_{i,j}$, $R_{i,j}$, and $S_{i,j}$ represent interpolation pixel data against the pixel data $P_{i,j}$ contained in the image data 400. The interpolation pixel data $Q_{i,j}$, $R_{i,j}$, and $S_{i,j}$ are respectively calculated by using the following formula (Formula 3).

$$Q_{i,j} = (P_{i,j} + P_{i,j+1})/2 \qquad \text{(Formula 3)}$$
$$R_{i,j} = (P_{i,j} + P_{i-1,j})/2$$
$$S_{i,j} = (P_{i,j} + P_{i,j+1} + P_{i-1,j} + P_{i-1,j+1})/4$$

Next, a coordinate value calculation circuit 52 will be explained. As shown in FIG. 6, the adjustment position coordinate 710 which is a coordinate value after the adjustment of both end pixels in the line image sensor 1 is input to the coordinate value calculation circuit 52. The coordinate value calculation circuit 52 uses the adjustment position coordinate 710 being input for calculating a coordinate value 520 of each pixel in the densification image data 500. An operation of the coordinate value calculation circuit 52 will be explained by referring to FIG. 7, wherein coordinates (adjustment position coordinate 710) of both end pixels $Ps_i$ and $Pe_i$ in the line image sensor 1 are respectively indicated as $(Xs_i, Ys_i)$ and $(Xe_i, Ye_i)$. A suffix i shows that this is an adjustment position coordinate in the i line of the image data 400. Here, it is determined such that reading pixel density of the line image sensor 1 is 8 pixels/mm, and pixel density of an image stored in the image memory 6 is 8 pixels/mm. $Xs_i$, $Ys_i$, $Xe_i$, and $Ye_i$ represent real values with a unit of ⅛ mm.

A coordinate $(XP_{i,j}, YP_{i,j})$ of the pixel data $P_{i,j}$ is calculated by using the following formula (Formula 4), wherein Nd represents a number of pixels being read in one line by the line image sensor 1, and j represents a pixel number inside one line.

$$XP_{i,j} = Xs_i + j \cdot (Xe_i - Xs_i)/(Nd-1) \quad \text{(Formula 4)}$$
$$YP_{i,j} = Ys_i + j \cdot (Ye_i - Ys_i)/(Nd-1)$$

Coordinates $(XQ_{i,j}, YQ_{i,j})$, $(XR_{i,j}, YR_{i,j})$, and $(XS_{i,j}, YS_{i,j})$ of the three interpolation pixel data $Q_{i,j}$, $R_{i,j}$, and $S_{i,j}$ corresponding to the pixle data $P_{i,j}$ are calculated by using the following Formula 5.

$$XQ_{i,j} = (XP_{i,j} + XP_{i,j+1})/2 \quad \text{(Formula 5)}$$
$$YQ_{i,j} = (YP_{i,j} + YP_{i,j+1})/2$$
$$XR_{i,j} = (XP_{i,j} + XP_{i-1,j})/2$$
$$YR_{i,j} = (YP_{i,j} + YP_{i-1,j})/2$$
$$XS_{i,j} = (XP_{i,j} + XP_{i,j+1} + XP_{i-1,j} + XP_{i-1,j+1})/4$$
$$YS_{i,j} = (YP_{i,j} + YP_{i,j+1} + YP_{i-1,j} + YP_{i-1,j+1})/4$$

The coordinate value calculation circuit 52 calculates the coordinate value 520 of each pixel inside the densification image data 500 by conducting the operation processes shown as Formula 4 and Formula 5 above.

An integral number circuit 53 makes the coordinate value 520, which is a real value, become an integral number and outputs an integral number coordinate value 530. When the real number coordinate value 520 is described as $(X_{real}, Y_{real})$ and the integral number coordinate value 530 is described as $(X_{int}, Y_{int})$, the integral number coordinate value is calculated by using the following formula (Formula 6).

$$X_{int} = [X_{real}] \quad \text{(Formula 6)}$$
$$Y_{int} = [Y_{real}]$$

In Formula 6, [ ] indicates an operation of rounding off below decimals. A round-down process of a decimal part after adding 0.5 is equivalent to an operation of rounding off.

Figure 10:
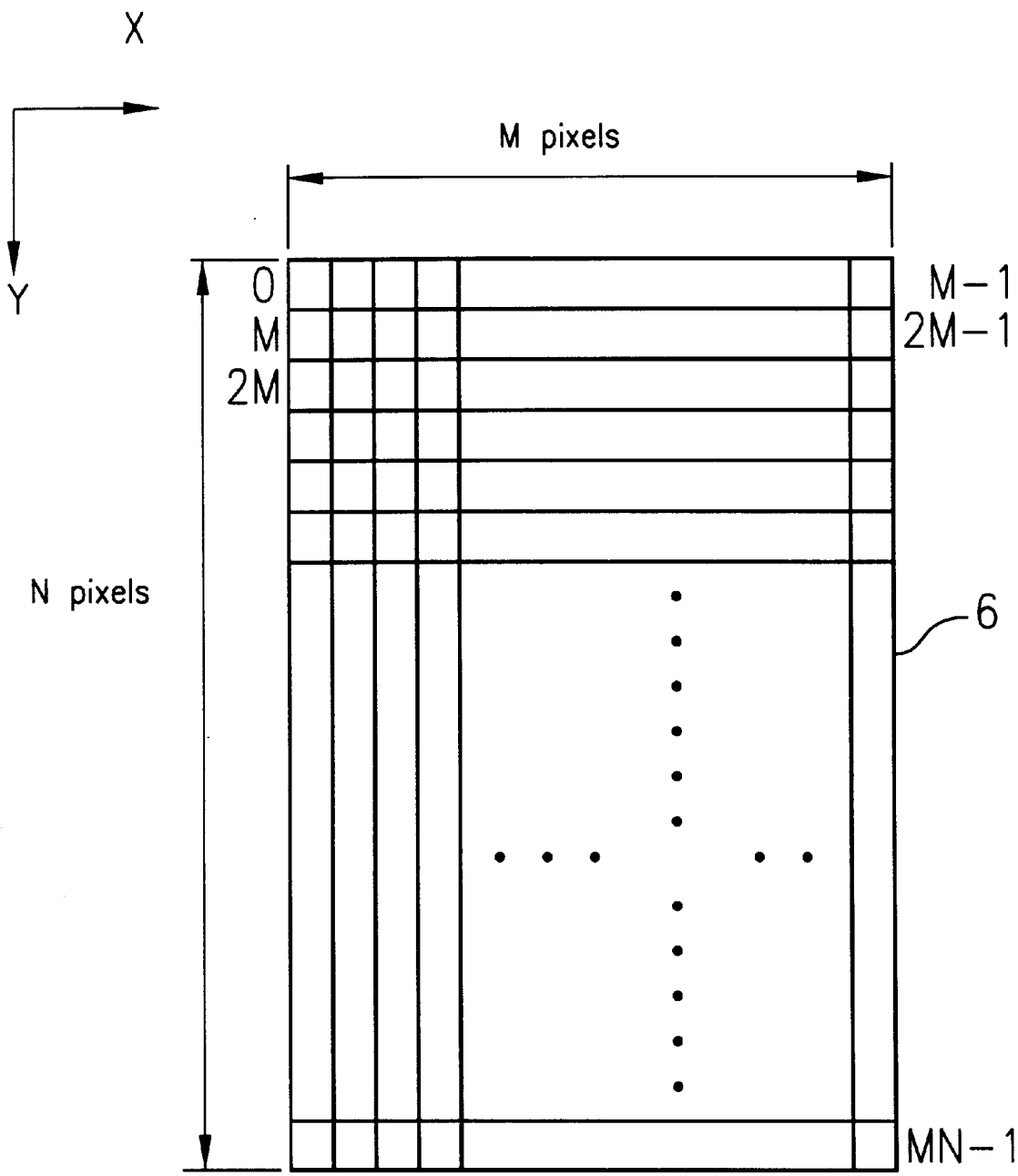
FIG. 10 is a schematic view showing an arrangement of addresses in an image memory of a first embodiment of this invention.

An address generation circuit 54 converts the integral number coordinate value 530 being output from the integral number circuit 53 to an address 540 in the image memory 6. FIG. 10 shows an arrangement of addresses in an image memory. The image memory 6 is a page memory comprising M pixels in the X direction and N pixels in the Y direction. An address of a pixel on the upper left side of the image memory 6 is 0, and an address of a pixel on the upper right side is (M−1), and an address of a pixel on the lower right side is (MN−1). When the integral number coordinate value 530 is described as $(X_{int}, Y_{int})$, the address ADR in the image data 6 is calculated by using the following formula (Formula 7).

$$ADR = X_{int} + M \cdot Y_{int} \quad \text{(formula 7)}$$

The real number coordinate value 520 and the integral number coordinate value 530 are input to an error calculation circuit 55, and the error calculation circuit 55 outputs a coordinate error 550 to a comparative circuit 56 which is caused by making the real number coordinate value 520 to become an integral number. When a coordinate error in the X direction is indicated as Ex, and a coordinate error in the Y direction is indicated as Ey, a coordinate error (Ex, Ey) is calculated by using the following formula (Formula 8).

$$Ex = |X_{real} - X_{int}| \quad \text{(Formula 8)}$$
$$Ey = |Y_{real} - Y_{int}|$$

In this formula, ‖ indicates an operation of obtaining an absolute value. Hereinafter, ‖ is used as an operator for obtaining an absolute value. Ex and Ey have values between 0 and 0.5.

The comparative circuit 56 compares the coordinate errors Ex, Ey with predetermined values. The comparavie circuit 56 outputs a signal 560 to an access circuit 57 which results in "1", when both coordinate errors Ex, Ey are smaller than the predetermined values mentioned above.

The access circuit 57 accesses the image memory 6 (FIG. 5) via the bus 600. An address in the image memory 6 is appointed by the address 540, which is output from the address generation circuit 54 to the access circuit 57. The densification image data 500 is stored in the image memory 6 by the access circuit 57, only when the judgement signal 701 is "0" and the signal 560 is "1". In other words, an optional pixel contained in the densification image data 500 is mapped to the image memory 6, only when this pixel is a pixel included in a new scanning area and that the coordinate errors Ex and Ey are smaller than the above-mentioned predetermined values. A pixel which does not satisfy both conditions is not mapped onto the image memory 6. By conducting a memory control of not storing new image data into an area being already stored on this image memory 6, even if a scanning position including an accumulated position error is input, image data having a smaller accumulated position error has priority of being stored in the image memory 6 at the time of sequentail overlapped reading, by scanning reciprocately with one-stroke by the hands, so that images having a small scanning position error are always stored on the image memory 6. By using this storage data for detecting position error, a connected composite image having less distortion can be obtained, thereby improving the quality of a image.

Figure 11C:
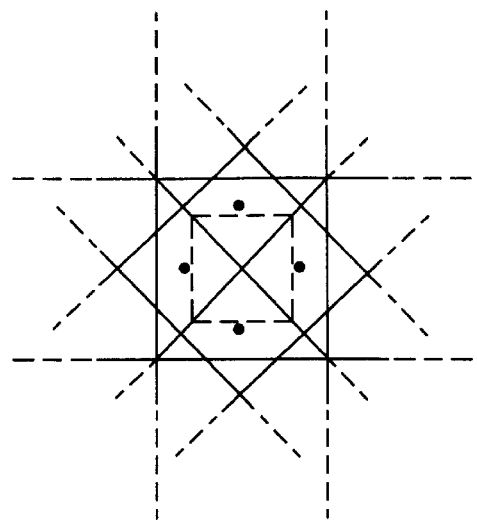
FIGS. 11 (*a*)–11 (*c*) are schematic views showing a mapping operation of densification image data to an image memory in a first embodiment of this invention.
Figure 11B:
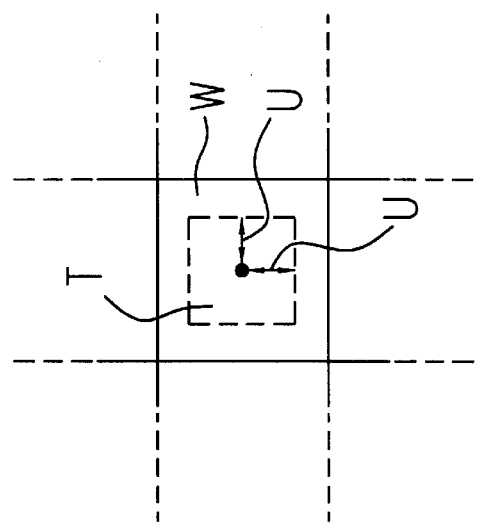
Figure 11A:
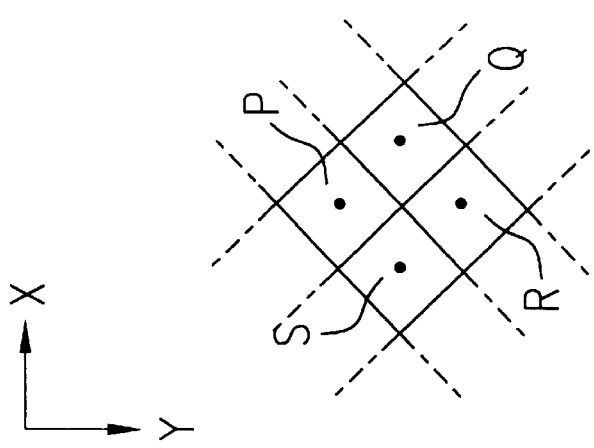

FIGS. 11 (a)–11 (e) are schematic views showing an operation of mapping densification image data to an image memory. FIG. 11 (a) shows the densification image data 500. In FIG. 11 (a), black dots show coordinate values of pixels P, Q, R, and S respectively. Pixel density of the densification image data 500 is 16 pixels/mm at a minimum. FIG. 11 (b) shows a pixel in the image data 6. In FIG. 11 (b), a black dot represents a coordinate value of a pixel W. A distance U shows a predetermined value used in the comparative circuit 56 of the mapping circuit 5. The image memory 6 stores image data having a pixel density of 8 pixels/mm. FIG. 11 (c) shows an example, in which the densification image data 500 (FIG. 11 (a)) and the pixel in the image memory 6 (FIG. 11 (b)) are stacked up in the same coordinate system. In case of FIG. 11 (c), each coordinate value of the pixels P, Q, R, and S in the densification image data 500 is present outside an area T, so that all the pixels P, Q, R, and S are not mapped to the pixel W in the image memory 6. In other words, there will be pixels present in the image memory 6 which are not mapped (map missing pixel), even though the pixels belong to an original reading area. By broadening the area T, the map missing pixels can be eliminated. However, when the area T is broadened, a coordinate error at the time of mapping becomes greater, and the image mapped onto the image memory 6 is distorted even more. In view of the distortion of the image, it is preferable that the area T is as narrow as possible.

A maximum value $U_{max}$ of the distance U for the purpose of preventing map missing pixels from arising is shown as Formula 9 below with a pixel pitch of the image memory 6 as a unit.

$$U_{max} = (\sqrt{2}/2)/2 \approx 0.35$$ (Formula 9)

In this embodiment, pixel density in the image memory 6 is 8 pixels/mm, so that the unit becomes ⅛ mm. By determining the distance U to be approximately 0.35, map missing pixels can be eliminated. When emphasis is placed on reducing distortion of the image by allowing map missing pixels to arise to some degree, the distance U should be determined in the range of 0.3–0.35. If the distance U ranges 0.3 and less, map missing pixels occur so frequently that the quality of reproduced image deteriorates considerably.

Figures 8A, 8B:
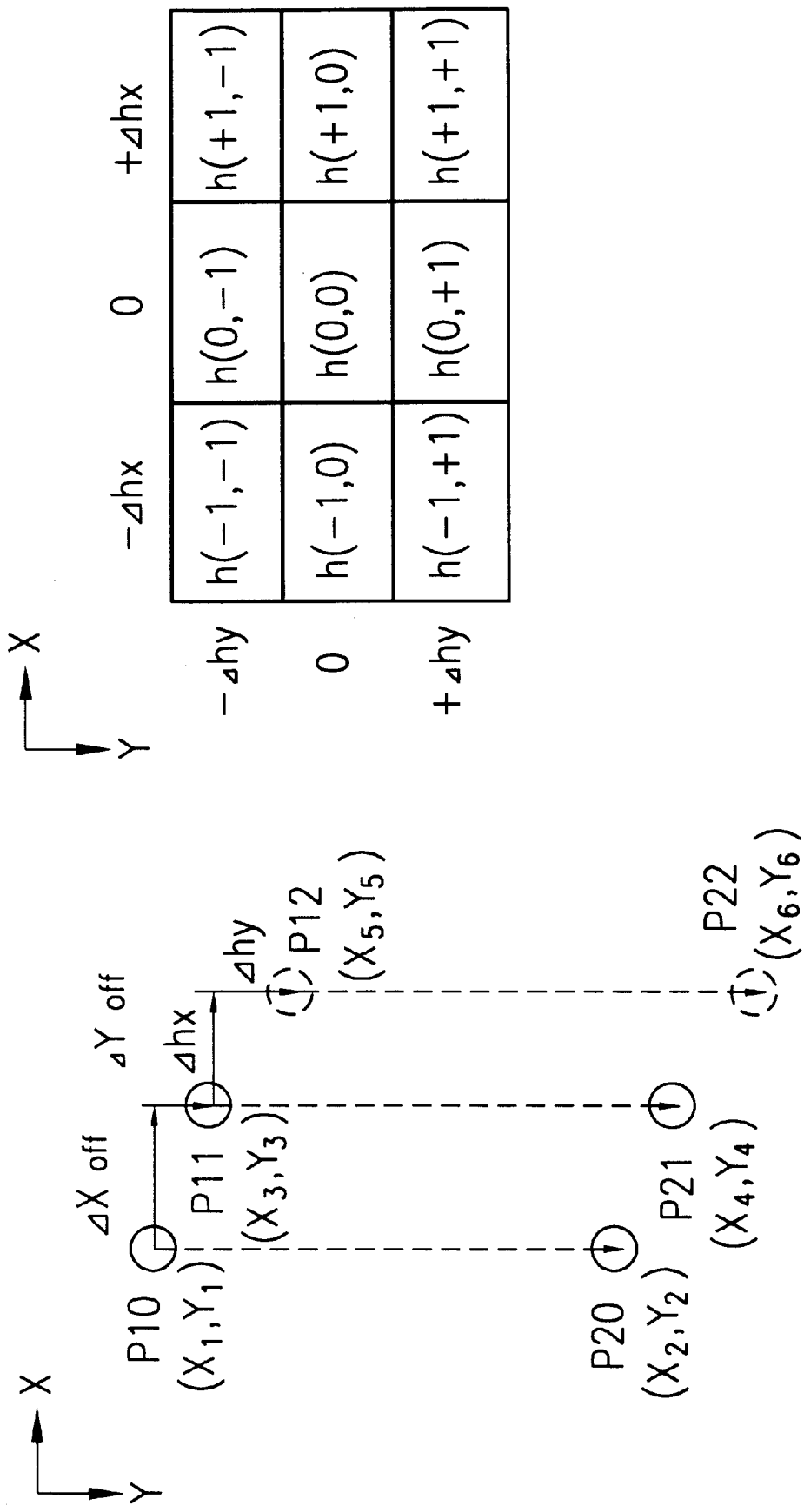
FIGS. 8 (*a*) and 8 (*b*) are schematic views showing a correlation table in a first embodiment of this invention.

An operation of the position error detection circuit 7 shown in FIG. 5 will now be further explained. FIGS. 8 (a) and 8 (b) are schematic views for explaining a correlation table. A image correlation circuit 72 will be explained by mainly referring to FIGS. 8 (a) and 8 (b). FIG. 8 (a) is a schematic view showing a correlation position subject to a correlation process; and FIG. 8 (b) is a schematic view showing a correlation table. The scanning position coordinate 300 in the i line being input to the position adjustment circuit 74 is determined as P10(X1, Y1) and P20(X2, Y2), while the position adjustment amount 703 are described as $\Delta Xoffset_i$ and $\Delta Yoffset_i$. The position adjustment circuit 74 makes use of the scanning position coordinate 300 and the position adjustment amount 703 for calculating P11 (X3, Y3) and P21 (X4, Y4) of the adjustment position coordinate 710 by using the following Formula 10.

$$X3 = X1 + \Delta Xoffset_i$$ (Formula 10)
$$Y3 = Y1 + \Delta Yoffset_i$$
$$X4 = X2 + \Delta Xoffset_i$$
$$Y4 = Y2 + \Delta Yoffset_i$$

Only when the judgement signal 701 from the overlapping area detection circuit 71 indicates "1" (namely, when the processed pixel is included in the overlapping scanning area), the image correlation circuit 72 calculates a correlation value of the processed pixel and renews the correlation table. The pixel Pn inside the image memory 6 corresponding to the coordinate of the procesed pixel is determined as a target pixel. The calculation of the correlation value is conducted by calculating a differential value between the image data inside the image memory 6 corresponding to a coordinate having a micro-value being increased or reduced against the coordinate of the processed pixel, and the image data of the processed pixel.

A coordinate ($Xh_{mn}$, $Yh_{mn}$) of a pixel data Ph subject to calculation of a correlation value of the processed pixel is calculated by using Formula 11 mentioned below, wherein a coordinate of the target pixel Pn is determined as (Xn, Yn), and micro-coordinate values are described as $\Delta hx$ and $\Delta hy$.

$$Xh = [Xn + \Delta hx \times m]$$ (Formula 11)
$$Yh = [Yn + \Delta hy \times n]$$

In this formula, m and n respectively comprise a value selected from −1, 0, and 1. Furthermore, [ ] shows an operation of rounding off below decimals.

In FIG. 8 (a), P12→P22 indicate positions of one line which calculates a correlation value with m=1 and n=1. When a value of correlation table which corresponds to the coordinate subject to this correlation value calculation is described as h (m, n), the correlation table shown as FIG. 8 (b) is formed.

Provided that the densification image data 500 comprises a pixel number j inside one line and a data value $Dn_j$, and that pixel data subject to the correlation value calculation inside the image memory 6 is determined as $Dh_{jmn}$, the value h (m, n) of each correlation table is calculated by the following Formula 12.

$$h(m, n) = ho(m, n) + |Dn_j - Dh_{jmn}|$$ (Formula 12)

Here, ho (m, n) is a value of the correlation value table which was formed by the correlation value calculation up to the pixel number (j−1). Before the correlation value calculation of one line starts, values in the correlation table are all initialized to "0".

The image correlation circuit 72 conducts the above-mentioned correlation value calculation for all the pixels contained in one line of the densification image data 500, and in this way, the image correlation circuit 7(2 completes the correlation table. Furthermore, the coordinate subject to the correlation value calculation is the adjustment position coordinate 710 which is calculated by Formula 10 mentioned above.

At the time when the calculation of the correlation value for one line is over, the image correlation circuit 72 retrieves ($m_{min}$, $n_{min}$) which holds the minimum value of h (m, n), which is then output to the adjustment amount calculation circuit 73 as the offset value 702. When there are a plurality of minimum values present in the correlation table, and when the minimum values include ($m_{min}$, $n_{min}$)=(0, 0), the minimum value of (0, 0) has priority of being used. The fact that the correlation value h ($m_{min}$, $n_{min}$) in the correlation table is small indicates that when a micro-value of ($\Delta hx \times m_{min}$, $\Delta hy \times n_{min}$) is added to the coordinate of each pixel for mapping, images inside the image memory 6 and images of a line to be mapped next correspond to each other most suitably. In addition, when a plurality of minimum values are present and when these minimum values include the center of a correlation window, the offset value 702 is set as "0". For example, a correlation window comprising 3×3 has h (0, 0) as its center. Here, m and n respectively comprise a value selected from −1, 0, and 1.

The adjustment amount calculation circuit 73 performs an operation shown as the following formula (Formula 13) by using the offset value 702 of ($m_{min}$, $n_{min}$). In this formula, the offset value 702 is described as $\Delta X = \Delta hx \times m_{min}$ and $\Delta Y = \Delta hy \times n_{min}$.

$$\Delta Xoffset_i = \Delta Xoffset_{i-1} + \Delta X \qquad \text{(Formula 13)}$$

$$\Delta Yoffset_i = \Delta Yoffset_{i-1} + \Delta Y$$

In Formula 13 mentioned above, a suffix i indicates the adjustment position amount 703 at the time when the correlation table in the i line of the densification image data 500 is completed. The position adjustment circuit 74 adjusts the scanning postion coordinate 300 by adding ($\Delta Xoffset_i$, $\Delta Yoffset_i$) to the scanning position coordinate 300, which is then output as the adjustment position coordinate 710.

According to the configuration of the image processing apparatus in this embodiment mentioned above, even if a position error is included in the scanning position being input, it is possible to detect a position error of the scanning position from image information consisting of image data and storage data for an overlapping scanning area which is scanned redundantly, and then to adjust the position error. Next, by storing the image data into the image memory 6 based on this adjusted scanning position, the image is prevented from being joined together with gaps which is caused by the position error in the scanning position. In this way, distortion of images which are connected together inside the image memory 6 can be reduced.

In addition, this embodiment refers to nine pixel positions subject to correlation, but it is not necessarily limited to nine positions. When an amount of position error should be large, the number of pixel positions subject to correlation can be increased to broaden a correlation range. Furthermore, a correlation table may be formed at an interval of N(N>1) scanning line, and a position error may be adjusted at an interval of N(N>1) scanning line. For example, it may be N=8.

EXAMPLE 2

Next, as a second embodiment of this invention, a process will be explained, in which an offset value 702 corresponding to a position error being detected by an image correlation circuit 72 (FIG. 5) is large.

When the offset value 702 corresponding to the position error being detected by the image correlation circuit 72 is large, a position adjustment amount 703 changes greatly at a position where the offset value 702 is added, and as a result, an adjustment position coordinate 710 changes greatly at a position being adjusted.

Figure 15:
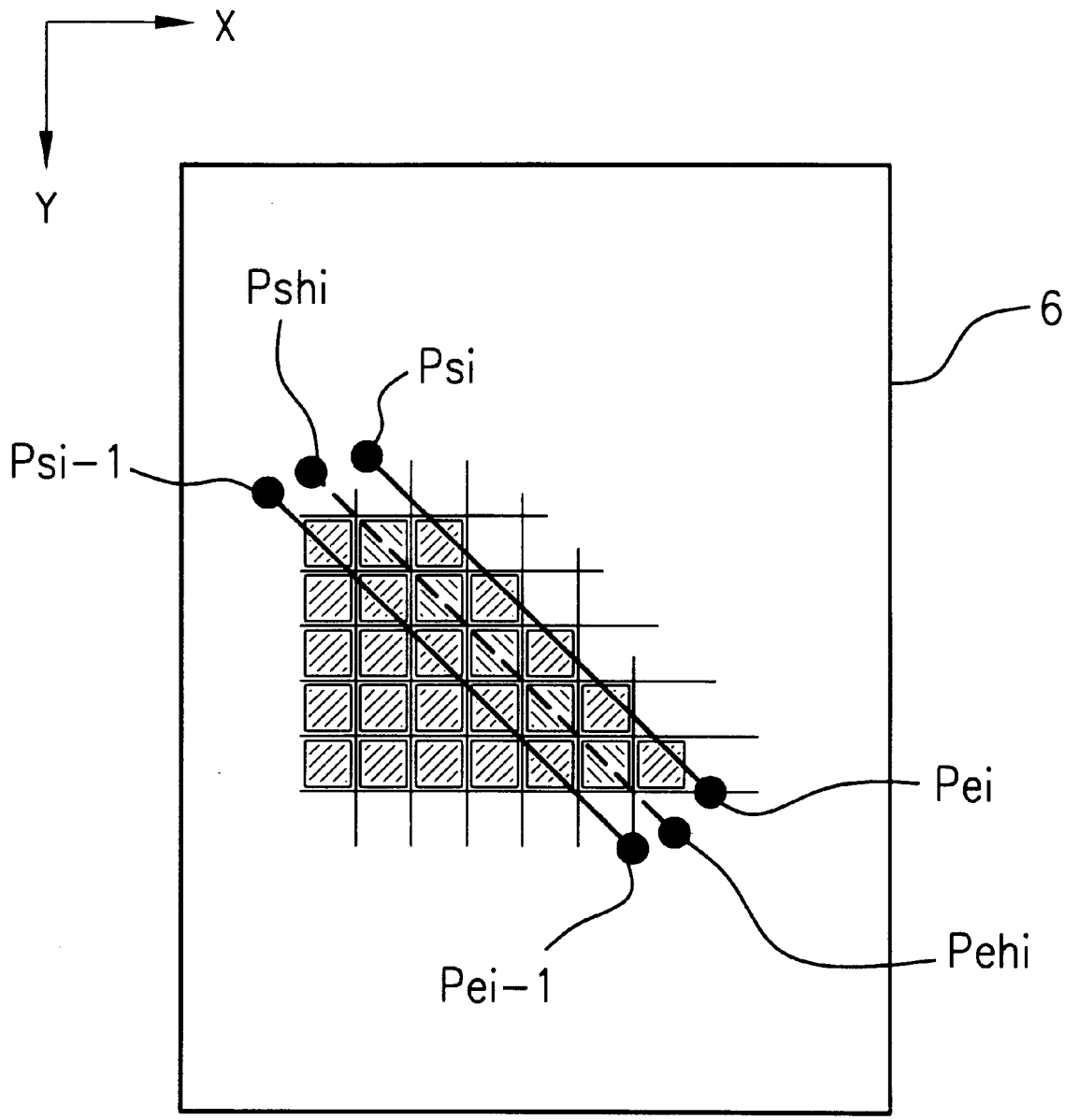
FIG. 15 is a schematic diagram showing a storage condition of data in an image memory of a second embodiment of this invention.

A storage condition of data in an image memory 6 will be explained by referring to FIG. 15, in which the adjustment position coordinate 710 changed greatly. FIG. 15 is a schematic diagram showing a storage condition of data in an image memory. In FIG. 15, the (i−1) line is determined as a line for conducting an image correlation detection, and the i line is determined as a line for conducting a position adjustment. Furthermore, both end pixels in the (i−1) line are indicated as $Ps_{i-1}$, $Pe_{i-1}$, and both end pixels in the i line are indicated as $Ps_i$, $Pe_i$.

As shown in FIG. 15, when a mapping circuit 5 stores image data into the image memory 6 in accordance to the adjustment position coordinate 710 at a position where an adjusted amount changes greatly, an area arises between the (i−1) line and the i line, in which data is not stored (map missing area caused by a position adjustment).

Figure 12:
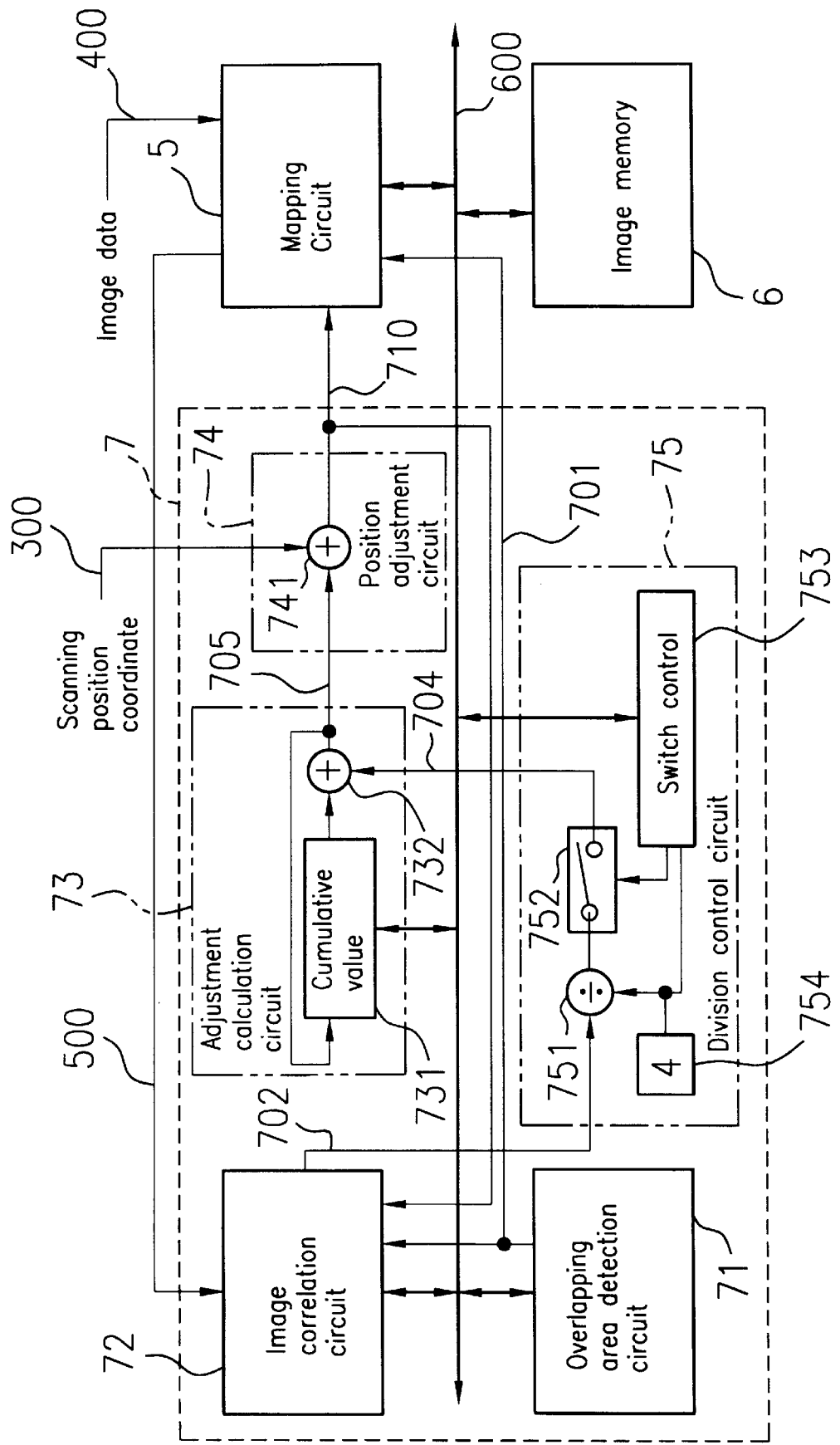
FIG. 12 is a block diagram showing a position error detection circuit including a division control circuit in a second embodiment of this invention.
Figure 13:
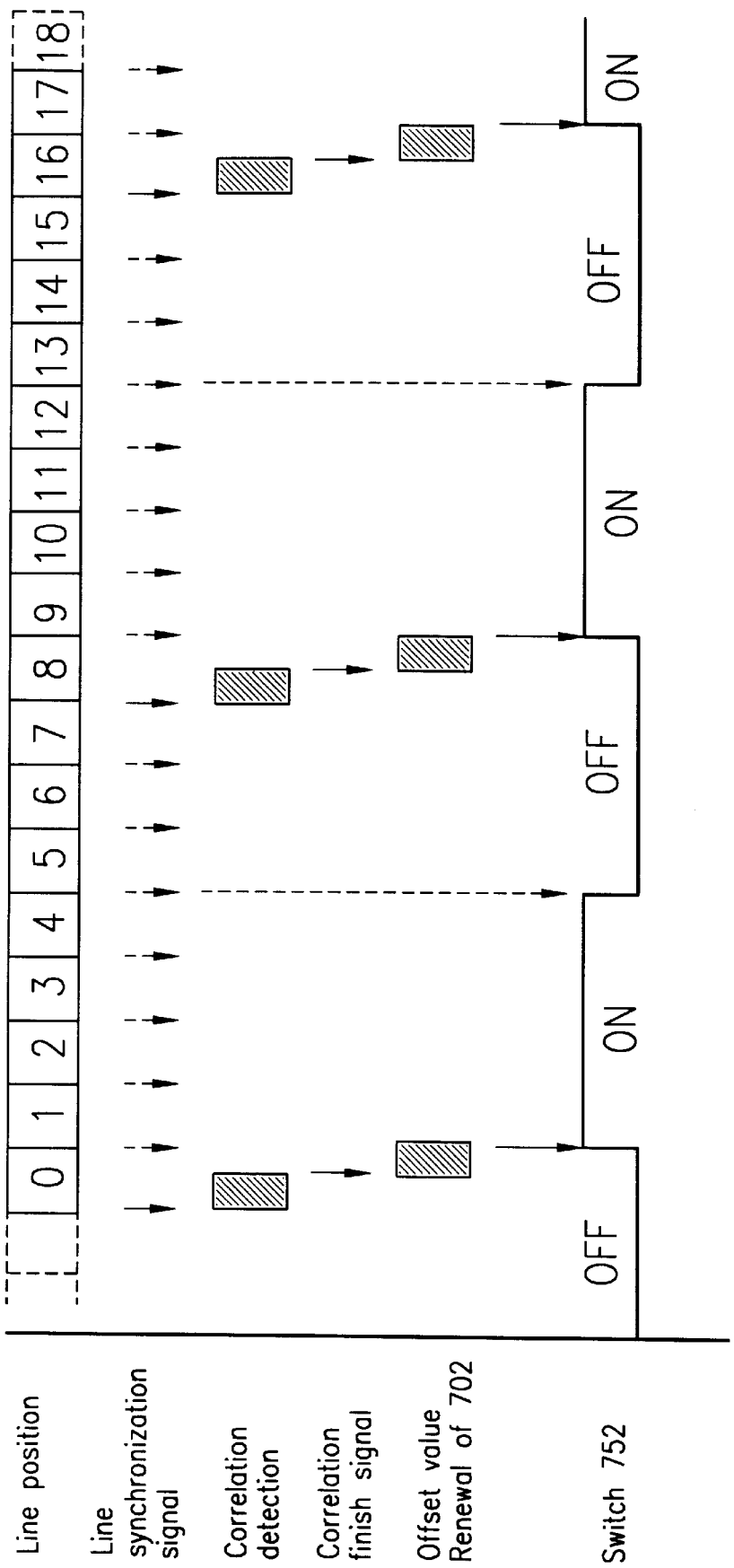
FIG. 13 is a timing chart of a division control circuit in a second embodiment of this invention.
Figure 14:
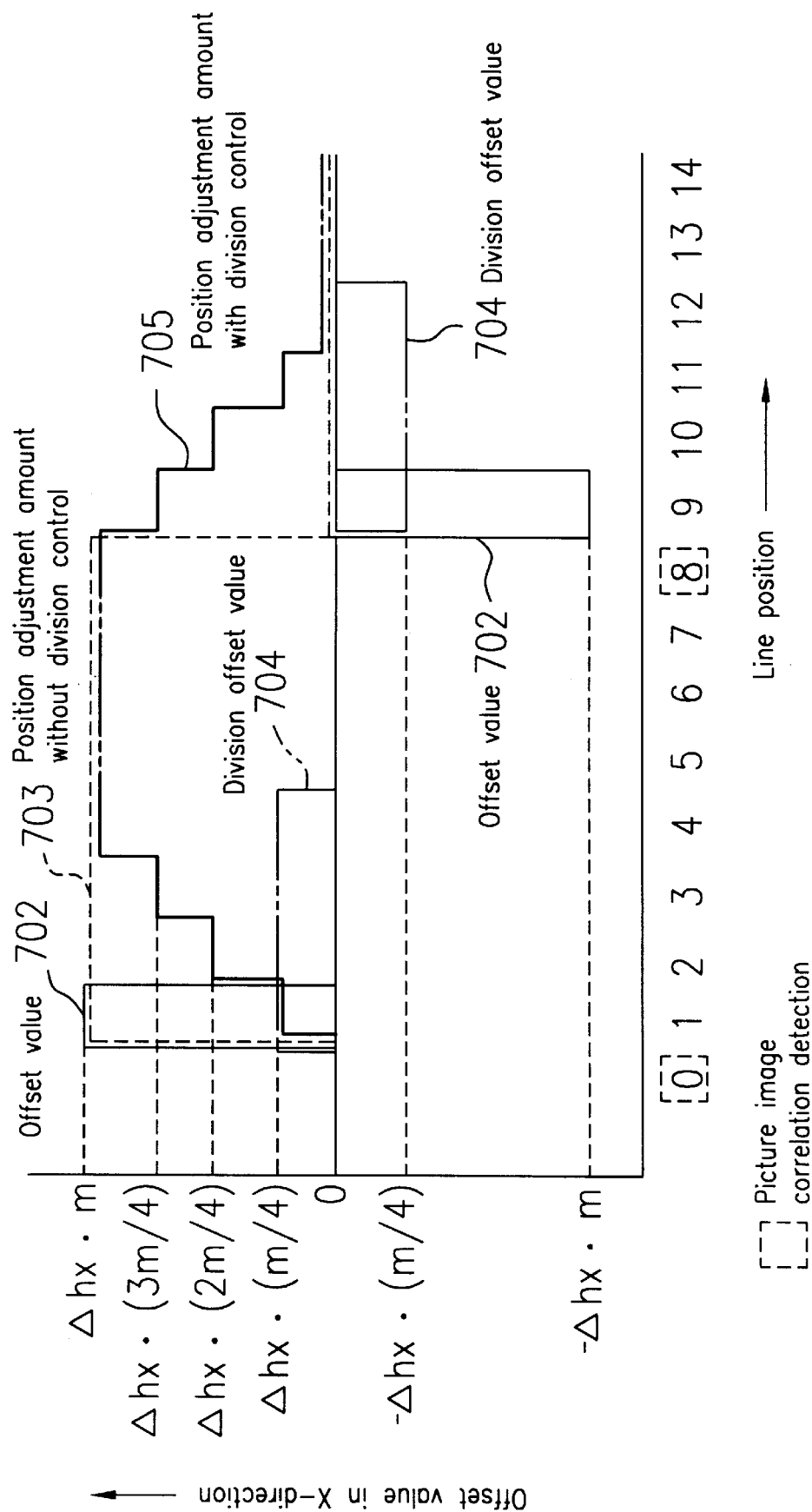
FIG. 14 is a schematic diagram showing a difference between a position adjustment amount and a division position adjustment amount in a second embodiment of this invention.

A method of preventing this area without storage data from arising will be explained with particular reference to FIGS. 12, 13, and 14. FIG. 12 is a block diagram showing a position error detection circuit including a division control circuit; FIG. 13 is a timing chart of a division control circuit; and FIG. 14 is a schematic diagram showing a difference between a position adjustment amount and a division position adjustment amount.

FIG. 12 differs from FIG. 5, which is a block diagram showing a position error detection circuit 7, in that the offset value 702 of the image correlation circuit 72 is not directly input into an adjustment amount calculation circuit 73. After the offset value 702 is converted by a division control circuit 75 to a division offset value 704 which prevents an area without storage data (map missing area caused by a position adjustment) from arising, the offset value 702 is then input to the adjustment amount calculation circuit 73.

In order to prevent the map missing area caused by a position adjustment from arising, a parameter NB which divides the offset value 702 is held by a register 754. The offset value 702 is divided by the division parameter NB held by the register 754 in an division circuit 751, and a switch 752 selects an ON/OFF output of the division circuit 751 by a control-output of a switch control 753. When it is "ON", a division offset value 704 is output from the division circuit 751, and when it is "OFF", the division offset value 704 is not output (no offset value). When the division parameter NB is $2^n$, the division circuit 751 can be formed in a n-bit shift. In addition, the division parameter NB is not specified and can be determined optionally according to a maximum value which can be attained by the offset value 702.

By referring to FIG. 13, an operation of the division control circuit 75 will be explained according to the timing chart. In this explanation, the division parameter NB is set as 4. Furthermore, a line position where an image correlation is first conducted is set as the i line, and an image correlation is detected at an interval of eight scanning lines. FIG. 13 shows only numbers of the line positions, for example, the i line is indicated as 0 (line position) and the (i+8) line is indicated as 8 (line position).

At the time when all the image signals in one line being read by a line image sensor 1 are mapped, the mapping circuit 5 outputs a line synchronization signal of one line by way of a bus 600 to the division control circuit 75 and the image correlation circuit 72.

When the first line position where a scanning starts is determined as an initialized line position (line position of i=0), the image correlation circuit 72 counts the line synchronization signal from the initialized line position. Then, when a remainder of a counting number i divided by 8 is 0, an image correlation is detected (excluding the initialized line position of i=0), and before the next line position is read, the offset value 702 is renewed in synchronization to the line synchronization signal. When the detection of image correlation is over, the image correlation circuit 72 outputs a correlation finish signal by way of the bus 600 to the switch control 753 of the division control circuit 75. The switch control 753 considers the next line position of the line position where the correlation finish signal of the image correlation circuit 72 is received as 1 in a counting value, and a line synchronization signal is counted beginning from the next line position. In correspondence to the division parameter NB held by the register 754, the switch control 753 turns the switch 752 ON when "1≦count value≦4", and the switch control 753 turns the switch 752 OFF when "count value>4".

The adjustment amount calculation circuit 73 inputs a division offset value 704 being divided, and adds a cumulative value of the register 731 which stored a position adjustment amount 705 for one line prior to that and the division offset value 704 with an adder 732, which is then output to a position adjustment circuit 74 as the position adjustment amount 705 being division-controlled (hereinafter referred to as a "division position adjustment amount").

Next, regarding the adjustment amount calculation circuit 73, a difference between the position adjustment amount 703 produced by inputting the offset value 702 (without division control, FIG. 5) and the division position adjustment amount 705 produced by inputting the division offset value 704 (with division control) will be explained by referring to FIG. 14.

Similar to FIG. 13, a line position where an image correlation is first conducted is set as the i line, and the image correlation is detected at an interval of eight scanning lines. FIG. 14 shows only numbers of the line positions, for example, the i line is indicated as 0 (line position) and the (i+8) line is indicated as 8 (line position). Also, the offset value 702 for cancelling a position error is indicated in the X-direction only, since the same process is applied in both the X-direction and the Y-direction. Furthermore, as for the i line position, a cumulative value of the register 731 in the adjustment amount calculation circuit 73 is determined as "0", and a division number of the register 754 in the division control circuit 75 is determined here as 4. When a correlation window of 3×3 is determined, the division number is sufficient with 4 in this way. When a correlation window of 5×5 is determined, the division number is sufficient with 8. The term "variable control amount" indicates the division offset value 704.

In FIG. 14, since image correlation detection is conducted in the i line and in the (i+8) line, the offset value 702 of the image correlation circuit 72 is ouput in the (i+1) line (offset value=$\Delta hx \times m$) and in the (i+9) line (offset value=$-\Delta hx \times m$).

When a division control is not conducted (FIG. 5), the adjustment amount calculation circuit 73 inputs the offset value 702, and the position adjustment amount 703 is obtained in the next (i+1) line by adding a cumulative value of the register 731 (cumulative value=0) and $\Delta hx \times m$ of the offset value. Similarly, the adjustment amount calculation circuit 73 obtains the position adjustment amount 703 in the (i+9) line by adding a cumulative value of the register 731 (cumulative value=$\Delta hx \times m$) and $-\Delta hx \times m$ of the offset value.

When a division control is conducted, the adjustment amount calculation circuit 73 inputs the offset value 704, and the division position adjustment amount 705 is obtained in the next (i+1) line by adding a cumulative value of the register 731 (cumulative value=0) and $\Delta hx \times (m/4)$ of the offset value. Furthermore, the adjustment amount calculation circuit 73 obtains the division position adjustment amount 705 in the (i+2) line by adding a cumulative value of the register 731 (cumulative value=$\Delta hx \times (m/4)$) and $\Delta hx \times (m/4)$ of the offset value. In the same way, the division position adjustment amount 705 is obtained up to the (i+4) line by sequentially adding $\Delta hx \times (m/4)$. As for the (i+4) line to the (i+8) line, the division offset value 704 becomes 0, so that there is no change. In addition, the adjustment amount calculation circuit 73 obtains the division position adjustment amount 705 in the (i+9) line by adding a cumulative value of the register 731 (cumulative value=$\Delta hx \times m$) and $-\Delta hx \times (m/4)$ of the offset value. In the same way, the division position adjustment amount 705 is obtained from the (i+9) line to the (i+12) line by sequentially reducing $-\Delta hx \times (m/4)$. From the (i+13) line, the division offset value 704 becomes 0, so that there is no change.

When a division control is not conducted, a detection of the large offset value 702 leads to a large increase or decrease of the position adjustment amount 703 in the (i−1) line and in the next i line where the detection of image correlation continues. Therefore, as shown in FIG. 15, an area without storage data (map missing area due to an adjustment) arises between the (i−1) line and the i line.

On the other hand, when division control is conducted, even if a large offset value 702 is detected, the division control circuit 75 divides the offset value 702 for each line, so that the division position adjustment amount 702 increases or decreases gradually in the (i−1) line and in the next i line where the image correlation is detected. Therefore, as shown in FIG. 16, the hi line which is determined by the division control is put between the (i−1) line and the i line in case of "no division control", so that an area without storage data (map missing area due to an adjustment) is prevented from arising in the lines between the (i−1) line and the i line. In this instance, the hi line is described as both end pixels $Ps_{hi}$, $Pe_{hi}$.

Furthermore, when a range subject to correlation is broadened, a scanning position is adjusted by a large offset value, so that an area without storage data (map missing area due to an adjustment) arises frequently. In this case, by conducting a division control, an area without storage data (map missing area due to an adjustment) in the image memory 6 can be controlled from arising, which leads to improvement in accuracy of position error detection at the time when an image correlation is detected. As a result, the qualtiy of images being reproduced on the image memory 6 is improved.

In addition, by increasing a number of pixels through densification of input image data, and also by mapping only pixels with less coordinate error at the time of mapping into an image memory and by conducting a division control, pixels which are not mapped in the image memory 6 are reduced considerably. Also, distortion of reproduced images being read, which is caused by coordinate conversion errors at the time of mapping, is reduced greatly. Further, because it is not necessary to increase the number of pixels in the line image sensor 1 and also to reduce a maximum manual scanning speed, quality of images on the image memory 6 is improved even more.

As mentioned above, according to the configuration of the image processing apparatus of this invention, since it is possible to variably control an adjustment value for adjusting a position error at a predetermined rate and to adjust a scanning position based on the adjustment value being stepwise varied and also to store image data into the image memory 6 based on the data of the adjusted scanning position, an area can be controlled from arising, in which image data inside the image memory 6 is not stored due to the adjustment of scanning position. Furthermore, the scanning position is not radically adjusted, so that a detection range of a correlation value can be reduced when a position error is detected from image information consisting of image data and storage data. In this way, a circuit can be reduced. In addition, since it is possible to prevent an area from arising in which image data in the image memory 6 is not stored (map missing), an error in the correlation value can be reduced at the time when a position error is detected from image information consisting of image data inside an overlapping scanning area and storage data, so accuracy of position error detection can be improved. As a result, the qualtiy of images being reproduced inside the image memory 6 is improved. Furthermore, when the image processing apparatus of this invention is constructed out of hardware, a processing can be sequentially conducted one line at a time, so that a circuit can be reduced, thereby enabling real-time processing.

In this embodiment, the densification image data 500 which is the input image data 400 being densified was used, and after the number of pixels was inceased, only pixels with less coordinate errors at the time of mapping were mapped to the image memory 6, but undensified image data 400 may be used as well. In this instance, by conducting a division control, an unmapped area can be prevented from arising. Furthermore, when a judgement of coordinate error at the time of mapping is 0.5 (in other words, when a coordinate error at the time of mapping is rounded off), either the input image data 400 ($P_{i,j}$) or t he densification image data 500 may be mapped to the image memory 6 in such a way that $R_{i,j}$, produced between scanning lines is always stored (cf. FIGS. 9 (a), 9 (b)). In this way, even if a distance which is wider than an acceptable distance arises between scanning lines, an area without i mage data being stored (map missing area) can be prevented from arising.

EXAMPLE 3

As mentioned above, the first and the second embodiments referred to a position error detection against the X-direction and the Y-direction of a scanning position. In this embodiment, a position error detection against the rotation direction of the scanning position is added, and this embodiment will be explained with reference to FIGS. 16, 17, and 18.

In the configuration shown in FIG. 3, reasons for causing a position error can be named as follows: slipping of wheels 31, 32 on the surface of an original; accuracy error between a diameter of the wheel 31 and a diameter of the wheel 32; accuracy error in a distance D between the wheels 31, 32; sinking of the wh eels 31, 32 into an original; a rotation center being influenced by a width between the wheels 31, 32 when rotated with a manual scanning, and so on. Therefore, by adding a position error against the rotation direction as a subject of adjustment, a position error can be adjusted with excellent accuracy.

A image reading part B shown in FIG. 16 is the same as that in Example 1. FIG. 16 differs from Example 1 in that a coordinate rotation conversion circuit 8 is added for detecting a position error against a rotation direction, and a delay circuit 9 is added for improving accuracy of position error detection. Incidentally, this delay circuit 9 is effective in improving adjustment accuracy of position error also in Example 1 and in Example 2. This effect will be explained later.

An image processing apparatus shown in FIG. 16 inputs a scanning position coordinate 300 obtained with a line as a unit and image data 400 corresponding to a scanning position subsequently from the image reading part B.

An analog output of a line image sensor 1 is amplified by an amplifier 102 and then converted to digital image data by an A/D converter 103. The digital image data is first stored in an image buffer 4. The image buffer 4 outputs the image data 400 corresponding in synchronization to the scanning position coordinate 300.

An adjustment amount calculation circuit 73 accumulates and holds an offset value 702 being output from an image correlation circuit 72.

A position adjustment circuit 74 adjusts a position error of the scanning position coordinate 300 by a position adjustment amount 703 being output from the adjustment amount calculation circuit 73 which accumulates and holds position errors, which is then output as an adjustment scanning position coordinate 710.

The delay circuit 9 delays the adjustment scanning position coordinate 710 and the image data 400 of the scanning line corresponding to the adjustment scanning position coordinate 710 with a scanning line as a unit.

A mapping circuit 5 produces a memory address 62 (ADRn) of each pixel data 61 (Pn) in one scanning line from coordinate data 92 of the adjustment scanning position coordinate 710 being delayed. Then, the mapping circuit 5 stores the pixel data 61 (Pn) which is subject to mapping among delayed image data 91 into a storage area (memory 65) of image data in the image memory 6.

Similar to the first embodiment, when the image memory 6 is configured as shown in FIG. 7, a write flag memory bit (bit 7) which holds scanning confimation information of the image data, corresponds to a memory 66, and image data memory bits (bit 0~6) correspond to a memory 65. Therefore, an overlapping area detection circuit 71 judges an overlapping area being scanned redundantly from the scanning confirmation information being stored in the memory address 62 (ADRn) of the memory 66, and the overlapping area detection circuit 71 outputs a judgement signal 701 of the overlapping scanning area.

The judgement signal 701 checks the write flag (bit 7) of the pixel Pn and judges whether the image data is already stored in the address 62 (ADRn) of the pixel data 61 (Pn). When bit 7 of the pixel data 61 (Pn) is 1, it shows that the image data from the line image sensor 1 is already stored in the memory address 62 (ADRn), so that the pixel data 61 (Pn) is judged as being included in an overlapping scanning area. Furthermore, when bit 7 of the pixel data 61 (Pn) is 0, the pixel data 61 (Pn) is judged as being included in a new scanning area. The overlapping area detection circuit 71 outputs the judgement signal 701 to the image correlation circuit 72 and to the mapping circuit 5. In this case, the judgement signal 701 is a signal which shows "0" when the pixel data 61 (Pn) is included in a new scanning area, and which shows "1" when the pixel data 61 is included in an overlapping scanning area.

The mapping circuit 5 stores the pixel data 61 (Pn) into the memory 65 when the judgement signal 701 is "0". On the other hand, the mapping circuit 5 does not store the pixel data 61 (Pn) into the memory 65 when the judgement signal 701 is "1". A series of this processing operation with one pixel as a unit is conducted to all the pixels of the image data 91 in one scanning line.

The coordinate rotation conversion circuit 8 outputs a correlation coordinate 800 which has a direction with the inclination of a micro-angle$\Delta\phi$ against the adjustment scanning position coordinate 710 [Ps–Pe] to the image correlation circuit 72 with one scanning line as a unit.

The image correlation circuit 72 produces a correlation detection address 63 of the pixel Pn which is subject to each correlation detection of one scanning line from coordinate data of the correlation coordinate 800. Then, the image correlation circuit 72 reads storage data 64 from a storage area (memory 65) of the image data in the image memory 6, and at the same time, the image correlation circuit 72 reads scanning confirmation information corresponding to the storage data 64 being stored from the memory 66, which is then output to the overlapping area detection circuit 71.

The overlapping area detection circuit 71 judges an overlapping area being scanned redundantly from the scanning confimation information of the memory 66, and outputs the judgement signal 701 of the overlapping scanning area.

The image correlation circuit 72 conducts a correlation value calculation process of the pixel Pn when the judgement signal 701 is "1". On the other hand, when the judgment signal 701 is "0", a correlation value calculation process of the pixel Pn is not conducted.

Figure 17:
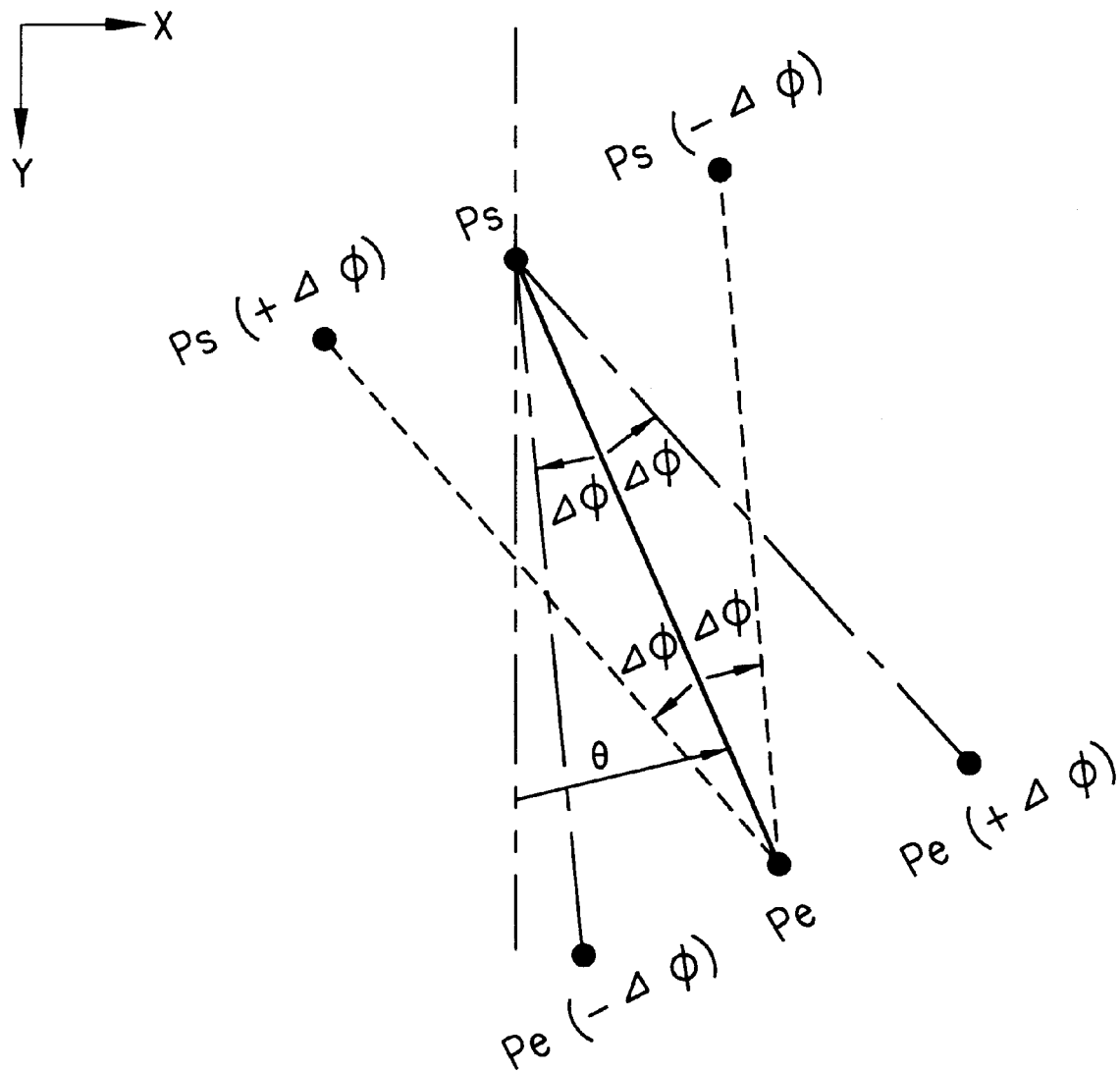
FIG. 17 is a schematic diagram showing an angle adjustment in a third embodiment of this invention.
Figure 19C:
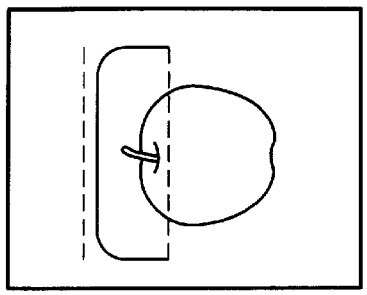
FIGS. 19 (a)–19 (e) are schematic diagrams showing a connection gap of an image being read which is caused by a position error of a scanning position.
Figure 19E:
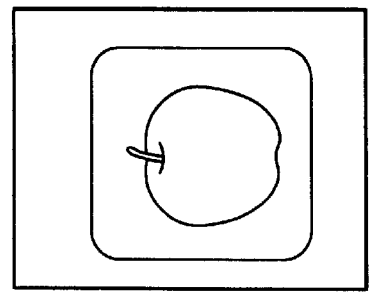
Figure 19B:
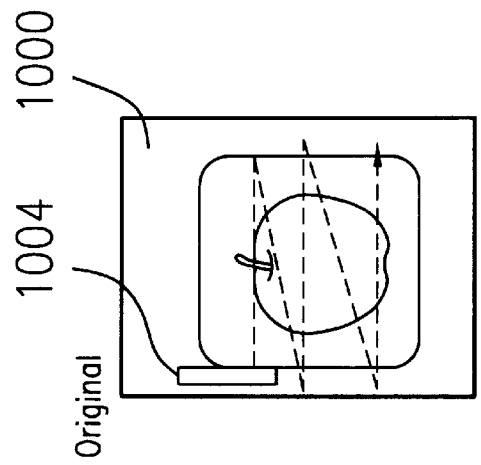
Figure 19D:
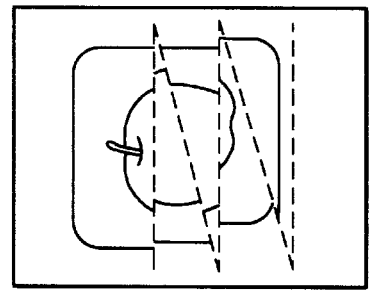
Figure 19A:
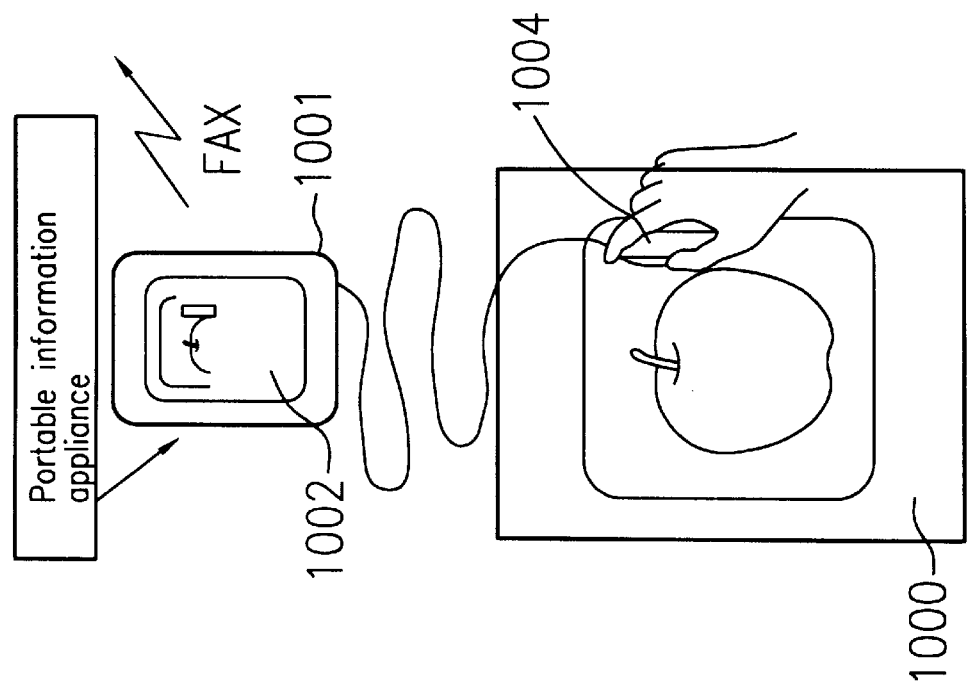

As shown in FIG. 17, a position error in the rotation direction can be detected in the image correlation circuit 72 by adding the correlation detection process of the correlation coordinate [Ps–Pe(±Δϕ)] which has the direction with the inclination of the micro-angle Δϕ against the scanning position coordinate 300 [Ps–Pe] or of the correlation coordinate [Ps(±Δϕ)–Pe]. In this way, a position error adjustment can be attained with even higher accuracy. In this instance, when this is combined with a correlation table value h (m, n) in the above-mentioned first embodiment, the correlation table value becomes h (l, m, n). Here, l has a value selected from −1, 0, and 1. A correlation table comprising three patterns in the angle direction (rotation direction) and nine patterns in the position direction (X, Y directions) which result in a total of 27 patterns is formed. When a minimum value of the correlation table is h (l, m, n), an adjustment amount of the angle Δϕ offset$_i$ is produced by performing a calculation of l·Δϕ. Here, Δϕ is, for example, 0.2 degrees. Besides, values of l, m, and n are not specified values, but they are values being determined by the required adjustment accuracy of position error. When the values of l, m, and n are increased, an area for conducting correlation becomes broader, so that adjustment accuracy improves.

As shown in FIG. 16, in order to detect the rotation direction of position error, a coordinate of the adjustment scanning position coordinate 710 is converted rotationally on the coordinate by the coordinate rotation conversion circuit 8, and either the correlation coordinate 800 [Ps–Pe (±Δϕ)] which has the direction with the inclination of the micro-angle Δϕ against the scanning position coordinate 300 [Ps–Pe] or the correlation coordinate 800 [Ps(±Δϕ)–Pe] is output.

The image correlation circuit 72 repeats the operations of the above-mentioned formulas (Formula 10 to Formula 12) according to each of the correlation coordinate 800 which has the direction with the inclination of the micro-angle Δϕ by the rotation conversion. Accordingly, a correlation table 67 having 27 patterns is formed. Here, l, m, and n have a value respectively selected from −1, 0, and 1.

By using this correlation table 67, the offset value 702 for adjusting a position error is detected.

At the time when a calculation of a correlation value against each angle of one scanning line is over, the image correlation circuit 72 retrieves ($l_{min}$, $m_{min}$, $n_{min}$) which holds the minimum value of h (l, m, n) and outputs to the adjustment amount calculation circuit 73 as the offset value 702. If there is a plurality of minimum values present in the correlation table 67, and if ($l_{min}$, $m_{min}$, $n_{min}$)=(0, 0, 0) is included in these minimum values, the minimum value of (0, 0, 0) has priority of being used. The fact that the correlation value h ($l_{min}$, $m_{min}$, $n_{min}$) in the correlation table 67 is the smallest indicates that when a micro-value of (Δϕ×$l_{min}$, Δh×$m_{min}$, Δh×$n_{min}$) is added to a coordinate of each pixel for mapping, image information between the storage data inside the image memory 6 and the image data of a line to be mapped next correspond to each other most suitably. Furthermore, if there is a plurality of minimum values present, and if the center of a correlation window is included in these minimum value, the X-direction and the Y-direction of the offset value 702 are determined as 0. For example, the center of the correlation window comprising 3×3 is h (1, 0, 0).

The adjustment amount calculation circuit 73 uses the offset value 702 ($l_{min}$, $m_{min}$, $n_{min}$) for the following operation (Formula 14). In this formula, the offset value 702 is determined as ΔX=Δh×$m_{min}$, ΔY=hy×$n_{min}$, ΔΨ=Δϕ×$l_{min}$.

$$\Delta Xoffset_i = \Delta Xoffset_{i-1} + \Delta X \quad \text{(Formula 14)}$$

$$\Delta Yoffset_i = \Delta Yoffset_{i-1} + \Delta Y$$

$$\Delta \phi offset_i = \Delta \phi offset_{i-1} + \Delta \Psi$$

In Formula 14 mentioned above, a suffix i indicates the position adjustment amount 703 at the time when a correlation table in the i line of the image data 400 is completed.

A position adjustment circuit 74 adjusts the scanning position coordinate 300 by adding ($\Delta Xoffset_i$, $\Delta Yoffset_i$, $\Delta \phi offset_i$) to the scanning position coordinate 300, which is then output as the adjustment scanning position coordinate 710.

The scanning position coordinate 300 in the i line being input to the position adjustment circuit 74 is determined as Ps (Xs, Ys), Pe (Xe, Ye), and the position adjustment amount 703 is determined as $\Delta Xoffset_i$, $\Delta Yoffset_i$, $\Delta \phi offset_i$. The position adjustment circuit 74 uses the scanning position coordinate 300 for calculating Psh (Xsh, Ysh), Peh (Xeh, Yeh) of the adjustment scanning position coordinate 710 by using Formula 15 mentioned below.

$$Xsh = Xs + \Delta Xoffset_i \quad \text{(Formula 15)}$$

$$Ysh = Ys + \Delta Yoffset_i$$

$$Xeh = Xs + \Delta Xoffset_i + (Nd - 1) \cdot \sin(\theta + \Delta \phi offset_i)$$

$$Yeh = Ys + \Delta Yoffset_i + (Nd - 1) \cdot \cos(\theta + \Delta \phi offset_i)$$

$$\theta = \arcsin[(Xe - Xs)/(Nd - 1)]$$

In this formula, the rotation center on the coordinate is always the coordinate Ps. Furthermore, arcsin [ ] represents a function of conducting an arcsine operation. Nd indicates a number of pixels being read in one line by the line image sensor 1. The rotation center on the coordinate may be determined as Pe. Also, both rotation conversions with the coordinate Ps as the rotation center on the coordinate and with the coordinate Pe as the rotation center on the coordinate may be conducted. By conducting both rotation conversions, a position error corresponding to both of the wheels 31, 32 can be detected.

Next, a method of improving adjustment accuracy of position error by the delay circuit 9 will be explained by referring to FIGS. 14, 16, and 18. FIG. 18 is a schematic diagram showing an operation of a delay circuit shown as FIG. 16.

A division position adjustment amount (with division control) 705 shown in FIG. 14 is different from the position adjustment amount (without division control) 703 in that the adjustment value corresponding to the offset value 702 changes stepwise, it lacks in a necessary adjustment amount in a scanning area corresponding to a number of scanning lines during the time of being variably controlled from the detection position of image correlation. When it lacks in the adjustment amount in this way, an adjustment value needed for cancelling a position error is not sufficient, so that a connection gap remains at the position where the position error is detected.

In order to avoid this condition of lacking in the adjustment amount, the adjustment scanning position coordinate 710 and the image data 400 are delayed in the delay circuit 9 with lines corresponding to a number of scanning lines during the time when the division position adjustment amount 705 is variably controlled. Then, in the mapping circuit 5, a mapping position and a detection position of position error being detected by the image correlation circuit 72 are made to differ.

In FIG. 14, since the detection position of position error and the position where the division position adjustment amount 705 becomes the same with the position adjustment amount 703 have a gap of four lines between each other, the delay circuit 9 delays the adjustment scanning position coordinate 710 and the image data 400 by four lines. Due to this delay, the division position adjustment amount 705 which is the same as the position adjustment amount 703 can be obtained at the mapping position of the mapping circuit 5. Accordingly, the adjustment amount needed for cancelling a position error can be assured, so that adjustment accuracy of position error can be improved even more.

Furthermore, as shown in FIG. 18, three types of conditions arise at the manually scanned position of an area being read by the line image sensor 1, namely, an area a, an area b, and a mixture of the areas a and b. A new scanning area is always in the condition of the area b, and an area comprising a mixture of an overlapping scanning area and a new scaning area is in the mixed condition of the area a and the area b, and an overlapping area only is in the condition of the area a.

In the area a, a storage condition of image data in the memory 65 (FIG. 16) is in the condition 1 at the position inside the correlation detection window when a position error detection is conducted. In this condition 1, all the storage data is present in the vicinity of a target pixel position, so that a correlation value for conducting a position error detection can be detected.

In the area b, on the other hand, a storage condition of image data in the memory 65 (FIG. 16) is in the condition 2 at the position inside the correlation detection window when a position error detection is conducted. In this condition 2, both positions where the storage data is present and is not present are present in the vicinity of a target pixel position in a mixed state. Therefore, when a position error detection is conducted inside this correlation detection window, correlation values will be one-sided. This is because the correlation value can be produced from image information consisting of image data and storage data at the position where storage data is present, but at the position where storage data is not present, since there is no storage data, the correlation value is produced from initialized data and image data. When a position error is detected from the correlation value produced on the basis of two different data, a detection error is bound to occur.

For eliminating a detection error, scanning confirmation information of the memory 66 is used. When it is judged by the scanning confirmation information that even one position has an unstored pixel at the position inside the correlation detection window (namely, in the condition 2), a correlation value is not produced. The judgement of whether an unstored pixel is present or not is made by using the judgement signal 701 being detected in the overlapping area detection circuit 71. In this way, the correlation values are not one-sided any more, so accuracy of position error detection can be improved.

By using the delay circuit 9 shown in FIG. 16, the mapping position and the detection position of position error are made to differ, and by putting the detection position of position error to be ahead of a movement direction of the line image sensor 1, adjustment accuracy of position error can be improved in a real-time process.

Incidentally, in the real-time process, when both a mapping process and a position error detection are conducted in parallel, pixels being mapped and stored newly in the vicinity of a target pixel arise frequently, so that the correlation value is influenced by the newly mapped pixels. Furthermore, when the detection position moves back and forth by an unintentional movement of the hands and so on, the influence by the newly mapped pixels becomes even greater, so that detection accuracy of position error deteriorates. Therefore, by making the mapping position and the detection position of position error to become different, and by putting the detection position of position error to be ahead of the movement direction of the line image sensor 1, the detection accuracy of position error can be improved by controlling the influence of the newly mapped pixels.

According to the configuration of the image processing apparatus of this invention mentioned above, by adding the adjustment of position error against the rotation direction which is caused by slipping of wheels, accuracy error between diameters of the wheels, accuracy error in a distance between the wheels, and sinking of the wheels into an original etc., the position error of the scanning position coordinate 300 can be adjusted with excellent accuracy.

In addition, by delaying the adjustment scanning position coordinate 710 and the image data 400 by the delay circuit 9, and by making the mapping position and the detection position of position error to become different, the correction value for cancelling the position error can be assured at the mapping position, so that adjustment accuracy of position error can be improved even more. Also, since it is possible to prevent data of a line being mapped immediately before from influencing the correlation value, adjustment accuracy of position error can be improved.

In the first to the third embodiments mentioned above, the input image data and the scanning position coordinate are input from a hand-held scanner which uses two encoders 2a, 2b generating pulses in accordance to the rotation of two wheels 31, 32 being installed at both ends of the line image sensor 1. However, it is not necessarily limited to this configuration only. For example, it may be configured such that a tablet or a sheet with a reference grid printed is used as an auxiliary equipment, and that it is input from a hand-held scanner which obtains the scanning position coordinate and the image data by detecting both ends of the line image sensor 1 (for example, U.S. Pat. Nos. 4,260,979 and 4,581,761).

In addition, in the first to the third embodiments mentioned above, although it is explained by referring to an example of an image processing apparatus which processes image signals being input from a hand-held scanner using the line image sensor 1, the image input device is not necessarily limited to the hand-held scanner. For example, image signals coming from an image input device which uses an arean image sensor may be processed as well.

Also, the same process as in the first to the third embodiments mentioned above may be attained by using a personal computer, a MPU (micro-processor unit), or a DSP (digital signal processor).

Figure 20:
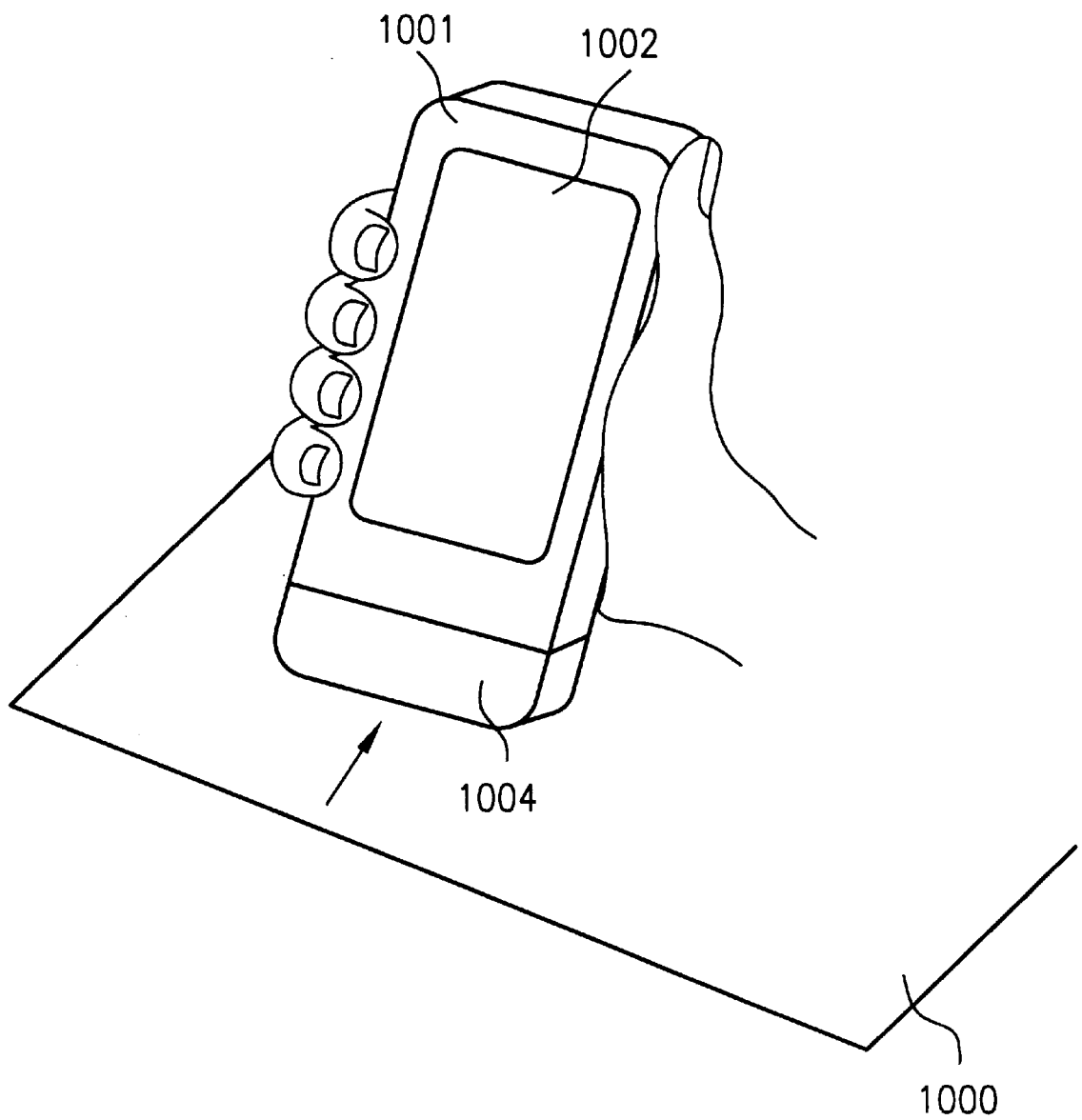
FIG. 20 is a perspective view showing an example of a portable terminal appliance in a third embodiment of this invention.
Figure 21:
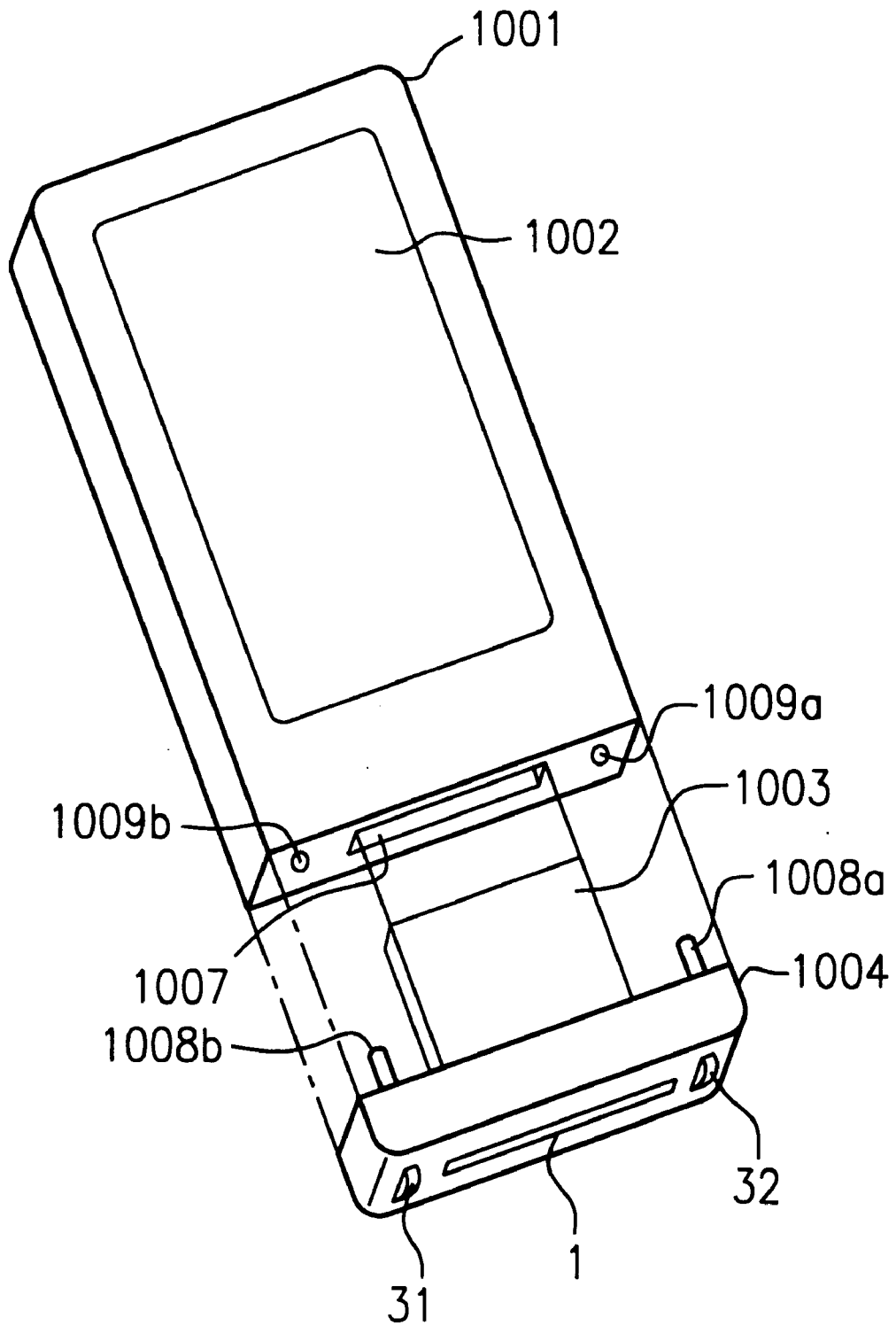
FIG. 21 is an expanded perspective view showing another example of a portable terminal appliance in a third embodiment of this invention.
Figure 22:
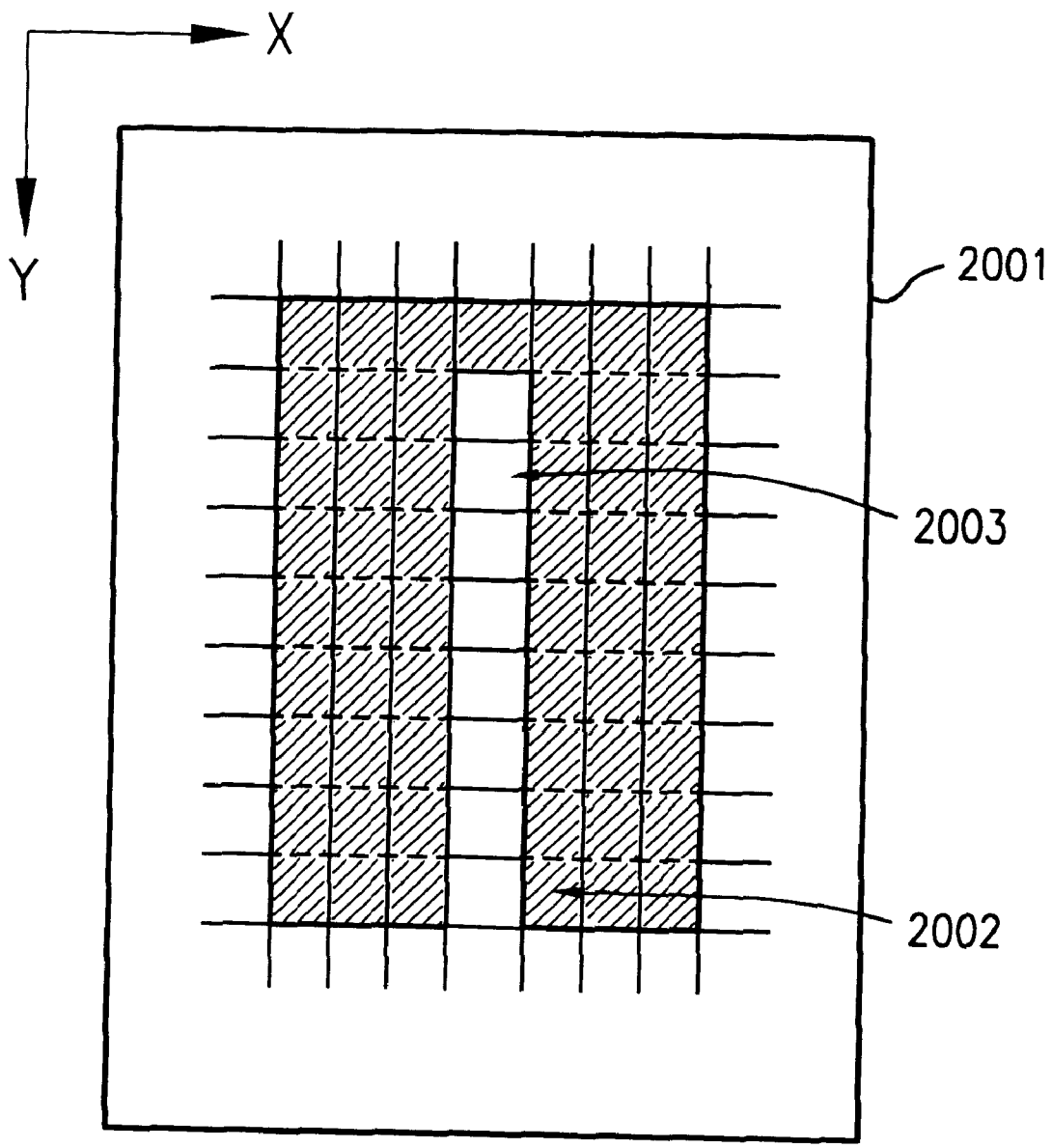
FIG. 22 is a schematic diagram showing an example of a map missing condition in conventional techniques.
Figure 23A:
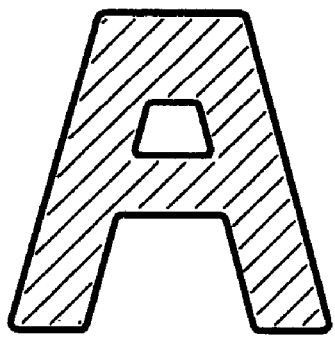
FIGS. 23 (a) and 23 (b) are schematic diagrams showing another example of a map missing condition in conventional techniques.
Figure 23B:
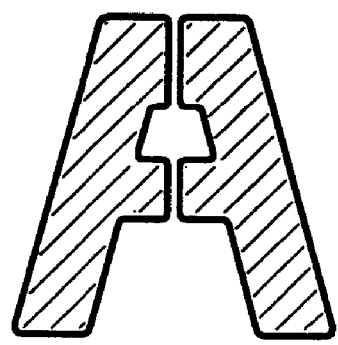

Furthermore, as shown in FIG. 19 (*a*), the image processing apparatus of this invention inputs images by a small input device 1004 having a limited reading range and forms wide-screen images by joining and composing partial images on an original 1000. Therefore, when the image processing apparatus of this invention is mounted to a main body 1001 of a portable information appliance, an image input of a large original can be conducted even if the portable information appliance has the small input device 1004. For example, this apparatus is suitable for a portable FAX, a portable information terminal, a portable scanner, and so forth. In FIG. 19 (a), 1002 represents a display device comprising a liquid crystal panel, CRT etc. Then, image data being read by the input device 1004 is stored into the image memory 6 in the inside, and the images which are joined and composed are displayed on the image memory 6. Also, as shown in FIG. 20, the input device 1004 can be miniaturized, so that it can be used integral with the main body 1001 of a portable terminal. The input device 1004 shown in FIG. 20 may be configured as being freely detachable from the main body 1001 of the portable terminal, as shown in FIG. 22. The input device 1004 is provided with an IC card 1003 which satisfies a standard I/F (interface) specification, and data can be transferred and controlled by inserting this IC card into an IC card slot 1007 of the main body 1001. In addition, the input device 1004 is also disposed with rock-pins 1008a, 1008b, and these rock-pins 1008a and 1008b are thrusted respectively into pin insertion holes 1009a, 1009b of the main body 1001 to fix the input device 1004 to the main body 1001 of the portable terminal. Here, the input device 1004 is installed with the line image sensor 1 and the wheels 31, 32 shown in FIG. 16. As a result, auxiliary equipment such as a tablet is no longer necessary, so that an input device which is small and excellent in operation can be attained. Also, by using a personal computer instead of the main body 1001 of the portable terminal, it is possible to attain an input apparatus which is small, excellent in operation, and is capable of a wide-screen input.

Furthermore, as shown in FIG. 19 (e), the image processing apparatus of this invention conducts an adjustment by accumulating a position error of a scanning position coordinate being detected, so that images without connection gaps can be produced by adjusting the position error, even with the use of the input device 1004 having a large cumulative position error. Therefore, as already applied in the first to the third embodiments mentioned above, when this image processing apparatus is mounted to a hand-held scanner which uses two encoders 2a, 2b for generating pulses in accordance to the rotation of two wheels 31, 32 disposed at both ends of the line image sensor 1, an even greater effect can be obtained. When this invention is compared with a hand-held scanner which uses a tablet or a sheet having a reference grid printed as an auxiliary equipment, since it is not necessary to use an expensive auxiliary equipment, an image processing apparatus which is small and excellent in portability and in operation can be attained. Furthermore, even a thick book can be read as well. Here, the input device 1004 is a scanner having the image reading part B shown in FIG. 16.

The invention may be embodied in other forms without departing from the spirit or essential characteristics thereof. The embodiments disclosed in this application are to be considered in all respects as illustrative and not as restrictive. The scope of the invention is indicated by the appended claims rather than by the foregoing description, and all changes which come within the meaning and range of equivalency of the claims are intended to be embraced therein.

What is claimed is:

1. An image processing apparatus, comprising:
   means for receiving sequential image data from a line sensor scanning an original image;
   means for receiving sequential data representing movement of said line sensor and calculating reading position coordinates of said line sensor;
   position error detection means for storing an accumulated position error of said reading position coordinates, for updating said accumulated position error on the basis of said image data and stored data stored in an image memory, said image data and stored data representing an overlapping scanning area being scanned redundantly, thereby calculating a position correction coordinate for reducing position error;
   position coordinate correction means for producing new reading position coordinates, said new reading position coordinates being derived by correction in a direction that reduces position error by adding position correction coordinates to said reading position coordinates of said line sensor; and
   mapping means for storing said image data into said image memory based on said new reading position coordinates.

2. The image processing apparatus as claimed in claim 1, further comprising:
   correction control means for controlling line-by-line the amount of correction of said position correction coordinates so as not to generate blank data area in which no image data are stored between two reading lines at the coordinates in the image memory,
      wherein said position coordinate correction means produces said new reading position coordinates by using said controlled position correction coordinates.

3. The image processing apparatus as claimed in claim 2, wherein said correction control means uses a value which is said position correction coordinate from said position error detection means being divided into a plurality of controlled correction values, and controls said position correction coordinates by varying at rates of said controlled correction values line-by-line.

4. The image processing apparatus as claimed in claim 2, further comprising:
   delay means for delaying said new reading position coordinates and said image data from said line sensor,
      wherein said mapping means differentiates the position of the detection line of said reading position coordinates from the position of the storage line for storing image data into said image memory by storing said image data from said line sensor into said image memory based on the delayed new reading position coordinates.

5. The image processing apparatus as claimed in claim 1, wherein said position error detection means comprises:
   scanning area retaining means which stores scanning confirmation information of image data being input into the image memory into a scanning confirmation information memory sequentially; and
   overlapping area detection means which detects an overlapping scanning area being scanned redundantly by detecting scanning confirmation information in said scanning confirmation information memory.

6. The image processing apparatus as claimed in claim 5, wherein an address of the image data being stored in the image memory and an address of scanning confirmation information being stored in the scanning confirmation information memory are shared.

7. The image processing apparatus as claimed in claim 5, further comprising:
   memory control means for controlling the storage of image data into the image memory according to a judgement of the scanning area made by the overlapping area detection means, wherein said memory control means prohibits the image data from being stored into said image memory when it is judged as the overlapping scanning area being scanned redundantly.

8. The image processing apparatus as claimed in claim 1, wherein said position error detection means comprises correlation means for detecting a correlation value of said image data and of the storage data being stored in said image memory against a peripheral pixel position coordinates including each target pixel position on a target line, respectively, said target line being a reading line of said line sensor being calculated based on said new reading position coordinates, and said position error detection means produces said position correction coordinates being previously determined based on the magnitude correlation of a plurality of correlation values produced by said correlation means so as to reduce the position error.

9. The image processing apparatus as claimed in claim 8, wherein said position error detection means produces a plurality of correlation values only when all the peripheral pixel positions including said target pixel position on said target line are overlapping scanning areas in the target pixel position being subjected to correlation.

10. The image processing apparatus as claimed in claim 1, wherein said position coordinate correction means accumulates with predetermined line intervals the position correction coordinates outputted from said position error detection means and corrects said reading position coordinates by said accumulated position correction coordinates.

11. The image processing apparatus as claimed in claim 1, further comprising:

position detection means comprising two detection means for detecting only the moving amount of said line sensor in the reading direction, wherein
said reading position coordinates are calculated from the output of said position detection means.

12. The image processing apparatus as claimed in claim 11, wherein said line sensor and said position detection means are installed in a hand-held scanner.

13. The image processing apparatus as claimed in claim 11, wherein said detection means comprises wheels which rotate in contact with a surface and encoders which output pulses corresponding to the rotation of said wheels.

14. The image processing apparatus as claimed in claim 13, wherein said encoder outputs two signals of pulses having different phases.

15. The image processing apparatus as claimed in claim 11, wherein said input device is detachably installed to a main body of a portable information appliance.

16. The image processing apparatus as claimed in claim 15, wherein said input device is installed to said main body of said portable information appliance by thrusting a lock-pin disposed in said input device into a pin insertion hole disposed in the main body of said portable information appliance.

17. The image processing apparatus as claimed in claim 1, wherein said image processing apparatus inputting through an input apparatus comprising the line sensor for reading image data and the position error detection means for detecting the reading position of said line sensor having two detection means, further comprises:

coordinate rotation conversion means for converting said corrected new reading position coordinates of said line sensors being detected by said two detection means rotationally on a coordinate; and said position error detection means comprises correlation means for detecting a correlation value between said image data and the storage data stored in said image memory against the peripheral pixel position including a target pixel position, respectively, said target pixel position being a storage address in the memory of each pixel on lines in the direction of each rotating angle, based on the new reading position coordinates converted rotationally by said coordinate rotation conversion means, and said position error detection means produces said position correction coordinates including rotating angle correction and position correction being previously determined based on the magnitude correlation of a plurality of correlation values to each rotating angle produced by said correlation means so as to reduce the position error.

18. The image processing apparatus as claimed in claim 17, wherein said image correlation means produces a plurality of correlation values obtained respectively against each rotation angle.

19. The image processing apparatus as claimed in claim 17, wherein said coordinate rotation conversion means converts new reading position coordinates at both ends of said line sensor rotationally into a plurality of directions on a coordinate with a line as a unit.

20. The image processing apparatus as claimed in claim 17, wherein said correlation means produces a plurality of correlation values which are obtained respectively with respect to said rotation angles with each scanning line as a unit.

21. The image processing apparatus as claimed in claim 1, wherein said position error detection means produces a plurality of correlation values only when all peripheral pixel positions including a target pixel position which are obtained against each rotation angle are overlapping scanning areas where pixel positions on said line sensor based on the new reading position coordinates are subjected to correlation.

22. The image processing apparatus as claimed in claim 1, wherein said mapping means comprises:

address generation means for producing storage address in said image memory which corresponds to each pixel position on a line sensor based on said corrected new reading position coordinates; and data storage means for storing each pixel of said image data into said storage address in said image memory.

* * * * *